(12) United States Patent
Lee et al.

(10) Patent No.: US 12,488,144 B2
(45) Date of Patent: Dec. 2, 2025

(54) SYSTEM FOR PROVIDING PERSONAL-INFORMATION-SHARING PLATFORM SERVICE BASED ON RIGHT TO DATA PORTABILITY

(71) Applicant: Whomi Global Inc, Seoul (KR)

(72) Inventors: Young Woo Lee, Seoul (KR); Young Seok Kim, Gyeonggi-do (KR); Sung Il Kim, Gyeonggi-do (KR); Kyu San Hwang, Seoul (KR)

(73) Assignee: Whomi Global Inc, Seoul (KR)

( * ) Notice: Subject to any disclaimer, the term of this patent is extended or adjusted under 35 U.S.C. 154(b) by 40 days.

(21) Appl. No.: 18/610,269

(22) Filed: Mar. 20, 2024

(65) Prior Publication Data
US 2024/0241985 A1    Jul. 18, 2024

Related U.S. Application Data

(63) Continuation of application No. PCT/KR2023/015464, filed on Oct. 6, 2023.

(30) Foreign Application Priority Data

Jan. 16, 2023   (KR) .................. 10-2023-0005820

(51) Int. Cl.
    *G06F 21/62*   (2013.01)
(52) U.S. Cl.
    CPC ................. *G06F 21/6245* (2013.01)
(58) Field of Classification Search
    None
    See application file for complete search history.

(56) References Cited

U.S. PATENT DOCUMENTS

2022/0366515 A1* 11/2022 Behrends ............... G06Q 20/02

FOREIGN PATENT DOCUMENTS

| KR | 20170045786 | 4/2017 |
|----|-------------|--------|
| KR | 20220073899 | 6/2022 |

\* cited by examiner

*Primary Examiner* — Cai Y Chen
(74) *Attorney, Agent, or Firm* — JCIPRNET

(57) ABSTRACT

Provided is a system for providing a personal-information-sharing platform service based on a right to data portability, the system including: a user terminal configured to consent to provision of personal information for use of the personal information, input at least one type of personal information for the use of the personal information, and set a price for the at least one type of personal information; a requester terminal configured to request personal information of the user terminal and view a preset item of personal information included in the personal information within a preset information usage period; and a platform-service-providing server including a consent storage unit configured to obtain consent to provision of personal information for use of the personal information from the user terminal, a database storage unit configured to receive at least one piece of personal information from the user terminal and store the received at least one piece of personal information, an auction unit configured to, upon receiving request of the requester terminal for the at least one piece of personal information, set a budget for using the at least one piece of personal information, and a period limit unit configured to, upon the requester terminal being awarded a bid, designate an information usage period, which is a viewing restriction, for the preset item of personal information among the at least one piece of personal information, and provide the information usage period.

8 Claims, 20 Drawing Sheets

CONSENT TO PROVISION OF PERSONAL INFORMATION (a)

SEARCH REQUESTER DB (b)

AUCTION (c)

SUNSET CLAUSE & SAFE NUMBER (d)

ABUSE PREVENTION (a)

UPLOAD REQUEST POST (b)

INFORMATION DISCLOSURE (c)

REVENUE STATUS (d)

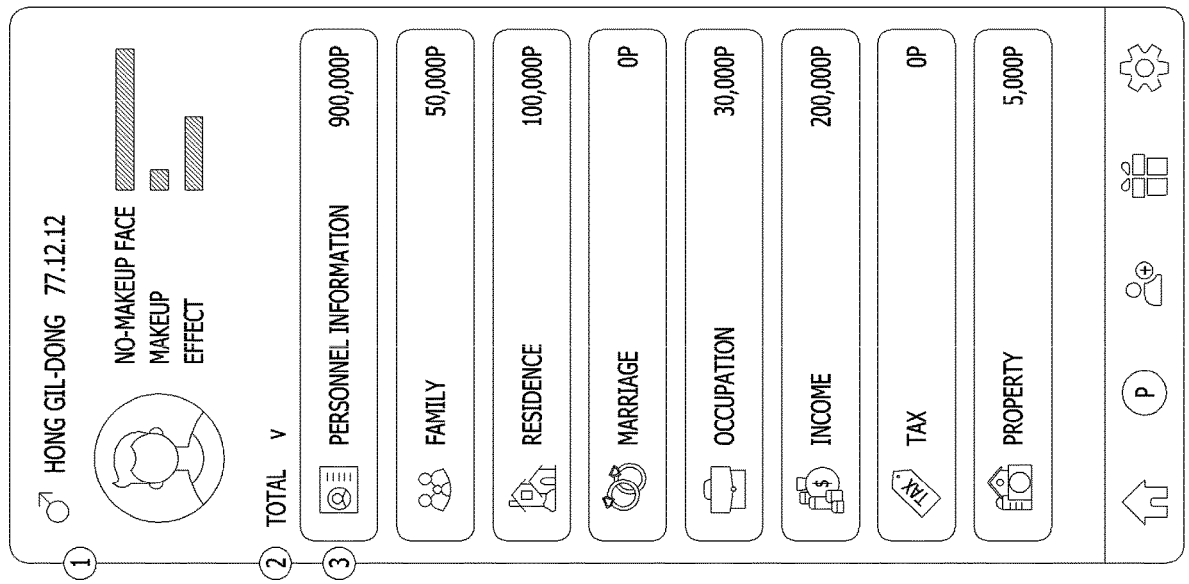

| 1 DEPTH INFORMATION CATEGORY | | |
|---|---|---|
| NUMBER | FUNCTION | POLICY |
| 1 | PROFILE | · EXPOSE MEMBERSHIP REGISTRATION INFORMATION, UTILIZATION OF SECURITY AUTHENTICATION INFORMATION, SEX, NAME, DATE OF BIRTH<br>· PROFILE PICTURES ARE REGISTERED ON THE MY PAGE<br>· DISPLAY ACQUAINTANCES-VERIFIED RESULTS AS GRAPHS |
| 2 | SORTING | · TOTAL: DEFAULT<br>· REGISTERED ITEMS<br>· UNREGISTERED ITEMS |
| 3 | 1 DEPTH ITEMS | · INDICATE REGISTRATION STATUS<br>· CLICK TO MOVE TO DETAILED PAGE OF CORRESPONDING ITEM<br>· MOVE BY SCROLLING<br>· DISPLAY CUMULATIVE SALES AMOUNT |

FIG. 4A

DETAILED TEXT FORMAT FOR 1 DEPTH INFORMATION (OFFICIAL INFORMATION)

| NUMBER | FUNCTION | POLICY |
|---|---|---|
| 1 | REGISTER INFORMATION | · MOVE TO INFORMATION REGISTRATION SCREEN |
| 2 | 1depth | · IN THIS MENU, LAND ON 1 DEPTH ITEM OF SELECTED ITEM<br>· MOVING TO 1 DEPTH IS POSSIBLE BY SWIPING LEFT AND RIGHT<br>· CALL UP INFORMATION DETAILS OF SELECTED ITEM IN DEPTH |
| 3 | INFORMATION | · CLICK TO MOVE TO DETAILED PAGE OF CORRESPONDING ITEM<br>· MOVE BY SCROLLING |
| 4 | INFORMATION BIDDING | · ENTER INITIAL INFORMATION, AND UPON ACCESSING THIS PAGE, PROVIDE INFORMATION BIDDING METHOD GUIDANCE AS TUTORIAL<br>· INFORMATION BIDDING IS AVAILABLE FOR EACH ITEM.<br>· BIDDING DISPLAYS MINIMUM AMOUNT SET BY ADMINISTRATOR, MAXIMUM AMOUNT FOR UNVERIFIED INFORMATION, AND MAXIMUM AMOUNT FOR VERIFIED INFORMATION.<br>· SET BIDDING PRICE BY JOG SHUTTLE (MINIMUM UNIT 10P).<br>· DISPLAY CURRENT DESIGNATED VERIFICATION PRICE<br>· UPON LEAVING PAGE, AUTOMATICALLY SAVE CURRENT BIDDING PRICE (UNDER SYSTEM LOAD, SAVE BUTTON OPTION IS AVAILABLE). |
| 5 | ALERT | · WHEN MOVING JOG SHUTTLE TO AMOUNT HIGHER THAN OR EQUAL TO MAXIMUM FOR UNVERIFIED INFORMATION WHILE INFORMATION HAS NOT BEEN VERIFIED. |
| 6 | PRICE ADJUSTMENT CONTROL | · SELECT WHETHER TO STANDARDIZE INFORMATION ITEMS WITHIN CATEGORY AT UNIFIED PRICE.<br>· WHEN PRICES ARE STANDARDIZED, ADJUSTING PRICE OF ONE ITEM ADJUSTS ALL ITEMS UNIFORMLY |

FIG. 4B

| INFORMATION REGISTRATION_ OFFICIAL INFORMATION | | |
|---|---|---|
| NUM BER | FUNCTION | POLICY |
| 1 | NAVIGATION | · ITEM TITLE<br>· GO BACK TO PREVIOUS PAGE<br>· SAVE |
| 2 | REGISTER INFORMATION | · REGISTER 1 DEPTH DETAILED ITEMS<br>· EDITABLE IN UNVERIFIED STATE<br>· NOT EDITABLE IN VERIFIED STATE |
| 3 | INFORMATION VERIFICATION BUTTON | · CLICK TO MOVE TO VERIFICATION INFORMATION PAGE |
| 4 | COMPLAINT DOCUMENT APPLICATION INFORMATION | · AUTOMATICALLY SET FOR PREVIOUSLY REGISTERED INFORMATION<br>· MANDATORY/OPTIONAL INFORMATION INPUT FOR BATCH ISSUANCE OF civil compliant DOCUMENTS<br>· USE EXTERNAL API FOR ADDRESS SEARCH<br>· REGISTER CORRESPONDING NUMBER FOR FAMILY INFORMATION (SELECT PARENTS, SPOUSE, CHILDREN)<br>· EXPAND PERSONAL INFORMATION, UNIQUE IDENTIFICATION INFORMATION COLLECTION FOR DETAILS<br>· SELECT METHOD FOR SELF-AUTHENTICATION<br>· PROCEEDS WITH BATCH ISSUANCE OF civil COMPLAINT DOCUMENTS UPON VERIFICATION |
| 5 | ALERT | · WHEN MANDATORY INFORMATION IS NOT PROVIDED |
| 6 | ALERT | · WHEN ENTERED INFORMATION FOR VERIFICATION IS INCORRECT |
| 7 | ALERT | · NOTIFICATION FOR NUMBER OF DOCUMENTS ISSUED IN BATCH ISSUANCE |
| 8 | ALERT | · WHEN ATTEMPTING TO COLLECT VERIFIED INFORMATION |

FIG. 4C

| 1DEPTH INFORMATION DETAILED IMAGE TYPE (NON-OFFICIAL INFORMATION) | | |
|---|---|---|
| NUMBER | FUNCTION | POLICY |
| 1 | SUBDEPTH | · DISPLAY SUB-CATEGORY NAME |
| 2 | INFORMATION | · DISPLAY PICTURE AND CONTENT TO REGISTER |
| 3 | VERIFY | · DISTINGUISH BETWEEN VERIFIED AND UNVERIFIED INFORMATION<br>· RECOGNIZE AS VERIFIED IF THERE ARE MANY POSITIVE VOTES THROUGH ACQUAINTANCE VERIFICATION<br>· DISPLAY ACQUAINTANCE VOTING RESULTS |
| 4 | REGISTER | · MOVE TO REGISTRATION PAGE |

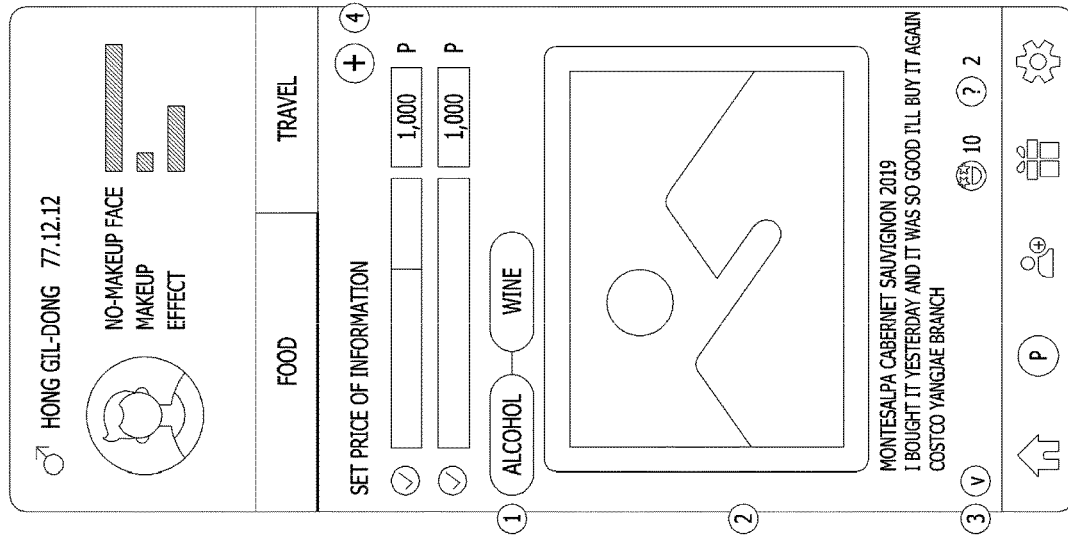

FIG. 4D

| 1DEPTH INFORMATION DETAILED IMAGE TYPE (NON-OFFICIAL INFORMATION) | | |
|---|---|---|
| NUMBER | FUNCTION | POLICY |
| | SUBPAGE | STORY REGISTRATION, LOCATION SEARCH, PHOTO REGISTRATION |
| 1 | NAVIGATION | · ITEM TITLE<br>· GO BACK TO PREVIOUS PAGE<br>· SAVE |
| 2 | CATEGORY | · SELECT SUBCATEGORY<br>· TREE STRUCTURE BY DEPTH |
| 3 | INFORMATION INPUT | · CONSISTS OF TITLE, CONTENT, LOCATION INFORMATION, PHOTO REGISTRATION<br>· MY INTERESTS: AUTOMATIC COMPLETION BASED ON KEYWORDS DIRECTLY REGISTERED BY MEMBERS ON THE PAGE (WHETHER HASHTAG FUNCTIONALITY IS POSSIBLE) ON THE PAGE<br>· CONTENT (STORY): CLICK TO MOVE TO INPUT PAGE (MAXIMUM 200 CHARACTERS)<br>· ADD LOCATION: CLICK TO MOVE TO LOCATION SEARCH PAGE (UTILIZING EXTERNAL API) |
| 4 | PHOTO REGISTRATION | · PHOTOS ARE CATEGORIZED INTO REGULAR PHOTOS AND RECEIPT PHOTOS (CONFIRMATION OF RECEIPT EXPOSURE ISSUE REQUIRED)<br>· UP TO 10 PHOTOS CAN BE UPLOADED, UP TO 2 RECEIPTS<br>· CLICK TO CALL PHONE GALLERY PAGE (PROVIDING PHOTO SHOOTING FUNCTION ON PAGE) |
| 5 | VERIFICATION | · CALLING KAKAO API: SELECT FRIENDS > SEND VERIFICATION REQUEST MESSAGE |

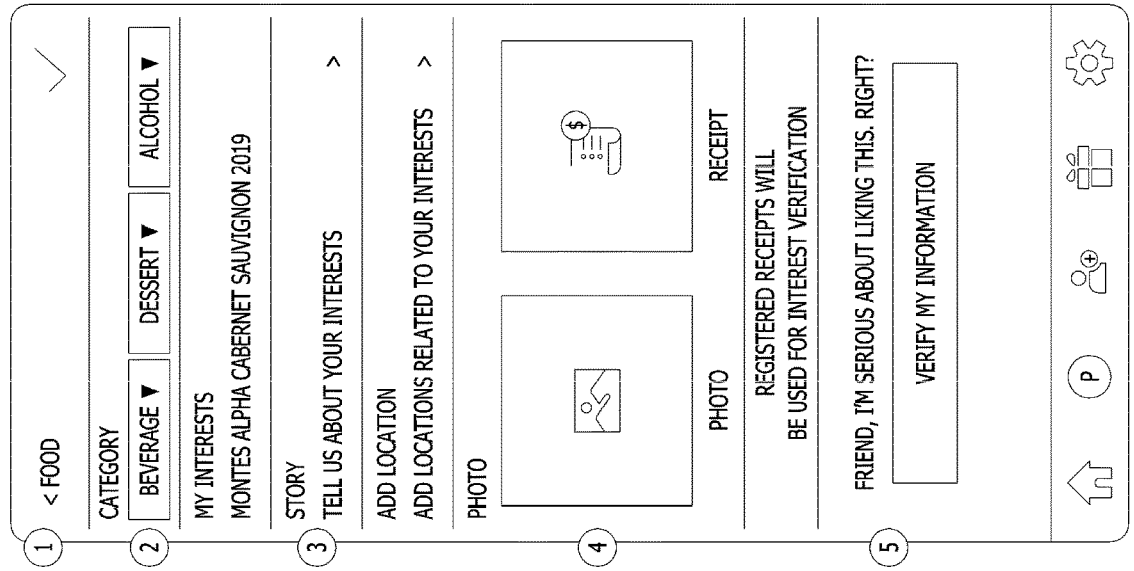

FIG. 4E

POINTS

| NUMBER | FUNCTION | POLICY |
|---|---|---|
| | SUBPAGE | STATUS, RANKING, SHOP, EXCHANGE |
| 1 | CURRENT POINTS | · DISPLAY CURRENTLY AVAILABLE POINTS |
| 2 | STATUS | · CLICK TO MOVE TO POINTS STATUS PAGE<br>∟ DISPLAY TOTAL ACCUMULATED POINTS, USED POINTS, EXPIRED POINTS, AND AVAILABLE POINTS<br>∟ DISPLAY DAILY POINT STATUS<br>(DIFFERENTIATING BETWEEN ACCUMULATION, PURCHASE, EXCHANGE, AND EXPIRATION) |
| 3 | RANKING | · RANKING BASED ON CUMULATIVE POINTS<br>· CURRENT RANKING EXPRESSED ON WEEKLY BASIS<br>· CLICK TO MOVE TO RANKING PAGE<br>∟ DIFFERENTIATED BY CUMULATIVE AND WEEKLY UNITS<br>∟ WEEKLY RANKING IS SET EVERY MONDAY AT 00:00 HOURS<br>∟ ONLY DISPLAY PERSONAL RANKING AND TOP 100 RANKINGS (NAME, RANK, POINTS)<br>∟ SAME CUMULATIVE POINTS ARE REPRESENTED AS SAME RANK. NEXT RANK IS CALCULATED BASED ON NUMBER OF PRECEDING MEMBERS WITH SAME RANK. |
| 4 | POINT SHOP | · SWIPE LEFT OR RIGHT TO VIEW REGISTERED PRODUCTS<br>· CLICK TO MOVE TO PRODUCT DETAIL PAGE<br>∟ EXPOSE LIST OF GIFT PRODUCTS REGISTERED BY THE ADMIN<br>∟ 1:1 EXCHANGE<br>∟ SENT TO PHONE NUMBER ENTERED IN CASE OF EXCHANGE, PHONE NUMBER CAN BE CHANGED |
| 5 | EXCHANGE | · CLICK TO MOVE TO EXCHANGE PAGE<br>∟ REGISTER DEPOSITOR'S NAME, PHONE NUMBER, BANK, AND ACCOUNT NUMBER<br>∟ 1:1 EXCHANGE |

FIG. 4G

MY PAGE

| < MY PAGE | |
|---|---|
| PROFILE PICTURE VERIFICATION | |
| SALES STATUS OF MY INFORMATION | > |
| MY POINTS | 60,000P > |
| TERMS OF SERVICE | > |
| LOCATION-BASED SERVICE TERMS AND CONDITIONS | > |
| PRIVACY POLICY | > |
| CONTACT US | > |
| PUSH NOTIFICATION SETTINGS | > |
| REGISTER PHONE NUMBER | 010-1234-1234 [CHANGE NUMBER] |
| LOGOUT | |
| WITHDRAWAL | > |

| MY PAGE | | |
|---|---|---|
| FUNCTION | | POLICY |
| SUBPAGES | | MY INFORMATION SALES STATUS, TERMS OF SERVICE, LOCATION-BASED SERVICE TERMS AND CONDITIONS, PRIVACY POLICY, CONTACT US, PUSH NOTIFICATION SETTINGS, WITHDRAWAL |
| PROFILE PICTURE | | · REGISTER AND CHANGE PROFILE PICTURE<br>· PROFILE PHOTO FRIEND VERIFICATION BUTTON AND PROCESS |
| MY INFORMATION SALES STATUS | | · CLICKING FOR DETAILED VIEW MOVES TO INFORMATION SALES STATUS PAGE<br>└ SALES DATA IN ORDER OF LATEST SALES, COMPANY NAME, SALES INFORMATION, AND AMOUNT |
| POINTS | | · CLICKING ON CURRENT AVAILABLE POINT DISPLAY TO MOVE TO POINTS DETAIL PAGE |
| TERMS AND CONDITIONS | | · MOVE TO DETAILED PAGES FOR USER GUIDE, TERMS AND CONDITIONS, PRIVACY POLICY, AND LOCATION-BASED SERVICE TERMS AND CONDITIONS |
| CONTACT US | | · MOVE TO DETAILED CONTACT US PAGE<br>└ SEND EMAIL TO ADMINISTRATOR<br>└ ENTER MEMBER EMAIL<br>└ DEVICE INFORMATION PROVISION: DEVICE INFORMATION, MODEL NAME, OS VERSION, APP VERSION |
| PUSH NOTIFICATION SETTINGS | | · MOVE TO PUSH NOTIFICATION SETTINGS PAGE<br>└ EVENT BENEFITS, FRIEND VERIFICATION, INFORMATION REGISTRATION GUIDE, INFORMATION SALES<br>└ CONTROL IN ON/OFF MODE |
| ACCOUNT | | · REGISTERED PHONE NUMBER: PROCEED WITH SELF-AUTHENTICATION PROCESS WHEN CHANGING<br>· LOGOUT<br>· WITHDRAWAL<br>└ INFORMATION ON POINT EXPIRATION UPON SELF-AUTHENTICATION AND WITHDRAWAL |

FIG. 4J

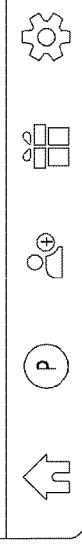

| MY INFORMATION SALES STATUS | | |
|---|---|---|
| NUMBER | FUNCTION | POLICY |
| 1 | NAVIGATION | · NAVIGATE TO MY PAGE |
| 2 | PRICE SETTING | · MOVE TO PRICE SETTING PAGE |
| 3 | STATUS | · EXPOSE IN ORDER OF LATEST DATE<br>· EXPOSE ONLY DEALS THAT HAVE BEEN COMPLETED<br>· EXPOSE INFORMATION BUYER, PURCHASED INFORMATION, EARNINGS (POINTS) |

① < MY INFORMATION SALES STATUS

② SETTING INFORMATION PRICE ∨

③

| DATE | BUYER | PURCHASE INFORMATION | POINTS |
|---|---|---|---|
| xx.xx.xx | o o | AGE MARRIAGE PHONE NUMBER | 20,000 |
| xx.xx.xx | o o | AGE FAMILY MARRIAGE PHONE NUMBER | 30,000 |
| xx.xx.xx | o o o | AGE SEX | 1,000 |
| xx.xx.xx | o o o | RESIDENCE | 500 |
| xx.xx.xx | o o o | SEX | 200 |

FIG. 4K

| INFORMATION PRICE SETTING | | |
|---|---|---|
| NUM BER | FUNCTION | POLICY |
| 1 | NAVIGATION | · MOVE TO INFORMATION STATUS PAGE |
| 2 | SORTING | · VIEW ALL, EXPOSE EACH 1DEPTH CATEGORY<br>· EXPOSE ONLY INFORMATION OF SELECTED CATEGORY WHEN CATEGORY IS SELECTED |
| 3 | PRICE SETTING | · EXPOSE ITEM NAME<br>· SET PRICE FOR EACH ITEM<br>· SAME AS EXISTING INFORMATION PRICE BIDDING METHOD |

OFFICIAL_INFORMATION_BATCH ISSUANCE OF civil compliant DOCUMENTS

| REQUIRED INFORMATION FOR CUSTOMER INPUT | ISSUED civil compliant DOCUMENTS | SYSTEM AUTOMATIC CONFIGURATION | REMARKS |
|---|---|---|---|
| | RESIDENT REGISTRATION CERTIFICATE | · PASSPORT INFORMATION UTILIZATION AGREEMENT<br>· ISSUANCE FORM: ISSUANCE | · USE ONLY STATE/PROVINCE/CITY/COUNTY/PROVINCE INFORMATION FROM ADDRESS DETAILS |
| | RESIDENT REGISTRATION CARD COPY | · ISSUANCE FORM: ISSUANCE | |
| | BASIC CERTIFICATE | · ISSUANCE TARGET: SELF<br>· DETAILED CERTIFICATE | |
| | FAMILY RELATIONSHIP CERTIFICATE | · NON-DISCLOSURE OF SOCIAL SECURITY NUMBER (LAST DIGITS)<br>· REASON FOR APPLICATION: SELF-IDENTIFICATION | |
| | MARRIAGE RELATIONSHIP CERTIFICATE | | |
| | CAR REGISTRATION COPY (COPY) | · NON-DISCLOSURE OF SOCIAL SECURITY NUMBER (LAST DIGITS) FOR FUELING<br>· DISPLAY FULL VEHICLE REGISTRATION DETAILS | · USE CURRENT ADDRESS AS PLACE OF RESIDENCE<br>· RETRIEVE ONLY VEHICLES OWNED BY ONESELF |
| REQUIRED_NAME<br>REQUIRED_RESIDENT REGISTRATION_NUMBER<br>REQUIRED_ADDRESS (BASIC, DETAILED)<br>REQUIRED PHONE_NUMBER<br>REQUIRED FAMILY INFORMATION (RELATIONSHIP, NAME)<br>OPTIONAL_CAR_REGISTRATION_NUMBER | ENTRY AND EXIT RECORD CERTIFICATE | · RECORD COMPARISON START DATE<br>· RECORD COMPARISON END DATE: CURRENT DATE<br>· OUTPUT OF ENTRY AND EXIT RECORDS : Y<br>· CREW RECORD PRINTOUT : Y<br>· OUTPUT OF INTER-KOREAN EXCHANGE RECORDS : Y<br>· NON-DISCLOSURE OF SOCIAL SECURITY NUMBER (LAST DIGITS) | · DECISION REQUIRED FOR START DATE OF RECORD COMPARISON |
| | TAX PAYMENT CERTIFICATE | · NON-DISCLOSURE OF SOCIAL SECURITY NUMBER (LAST DIGITS)<br>· DISCLOSURE OF ADDRESS: PUBLIC<br>· PURPOSE OF USE: OTHER | |
| | INCOME CERTIFICATE | · NON-DISCLOSURE OF SOCIAL SECURITY NUMBER (LAST DIGITS)<br>· DISCLOSURE OF ADDRESS: PUBLIC<br>· PURPOSE OF USE: OTHER<br>· DISCLOSURE OF INCOME SOURCE: PUBLIC<br>· ALL EMPLOYERS SUBJECT TO WITHHOLDING TAX ON DAILY LABOR INCOME: ALL DISPLAYED<br>· CERTIFICATION PERIOD: 20000101~PRESENT | · DECISION REQUIRED FOR START DATE OF INQUIRY PERIOD |
| | LOCAL TAX TAXATION CERTIFICATE BY TAX ITEM | · CLASSIFICATION: INDIVIDUAL<br>· SOCIAL SECURITY NUMBER DISPLAY: PARTIAL DISPLAY<br>· TAXATION YEAR: 2000 ~ 2022<br>· PURPOSE OF USE: SELF-IDENTIFICATION<br>· FULL LIST INQUIRY OF TAXATION DETAILS | · PROCEED WITH TAXATION BASED ON CURRENT ADDRESS<br>· TAXATION FOR PROPERTIES IN OTHER REGIONS WILL BE CONDUCTED SEPARATELY<br>· INQUIRY OF TAXATION DETAILS CAN BE SELECTED AFTER RETRIEVING WITH ENTERED INFORMATION (CONFIRMATION OF SELECTION TIMING WHEN PROCEEDING WITH APT) |
| | NATIONAL PENSION INSURANCE SUBSCRIBER MEMBERSHIP CERTIFICATE | · AGREEMENT ON COLLECTION AND CONSENT TO PERSONAL INFORMATION: CONSENT | |
| | NATIONAL PENSION CALCULATION USE SUBSCRIPTION HISTORY CONFIRMATION CERTIFICATE | · AGREEMENT ON COLLECTION AND USE OF UNIQUE IDENTIFICATION INFORMATION: CONSENT | |
| | DRIVING EXPERIENCE CERTIFICATE | · DRIVING LICENSE HISTORY: ALL<br>· VIOLATION OF LAWS: ALL<br>· TRAFFIC ACCIDENTS: ALL | |

| FRIEND AUTHENTICATION PROCESS | |
|---|---|
| PROCESS & DESCRIPTION | POLICY |
| 1. SELECTING KAKAOTALK FRIENDS FOR VERIFICATION | • FRIEND AUTHENTICATION IS ONLY POSSIBLE FOR NON-OFFICIAL INFORMATION<br>• SELECT KAKAOTALK FRIENDS WHO WILL VERIFY YOUR INFORMATION (MAXIMUM NUMBER LIMIT) |
| 2. SENDING NOTIFICATION MESSAGES | • SENDING NOTIFICATION MESSAGES TO SELECTED KAKAOTALK MEMBERS<br>└ DOES YOUR FRIEND HONG GIL-DONG REALLY LIKE BLACK BEAN NOODLES?<br>(VOTING RESULTS ARE DISPLAYED ON INFORMATION PAGE, VERIFICATION OCCURS IF THERE ARE MANY POSITIVE VOTES, POLICY DECISION REQUIRED FOR MINIMUM POSITIVE VOTING NUMBER)<br>└ CLICKING THE "VOTE NOW" BUTTON REDIRECTS TO CHINNAH MOBILE WEB<br>└ IF CHINNAH APP IS INSTALLED ON FRIEND'S PHONE, VOTING IS CONDUCTED ON CHINNAH MAIN PAGE<br>(DECISION REQUIRED ON WHETHER TO CONDUCT VOTING EXCLUSIVELY ON MOBILE) |
| 3. AUTHENTICATE (VOTE) IN NON-LOGGED-IN STATE AFTER VISITING FRIEND | • VOTE ON MOBILE WEB PAGE<br>• EXPOSE INFORMATION AND IMAGES REGISTERED BY INFORMATION SUBJECT<br>• PROFILE PICTURE VERIFICATION REFLECTS FUN ELEMENT<br>• OTHER ITEMS ARE EXPRESSED WITH WIT USING "YES" OR "NO" |
| 4. ENCOURAGE FRIEND TO SIGN UP | • GIVE GIFTS UPON MEMBERSHIP REGISTRATION (POINTS OR GIFTICON)<br>• PROMOTE APP DOWNLOAD DURING REGISTRATION PROCESS |

FIG. 4N

| POINTS | |
|---|---|
| FUNCTION | POLICY |
| PERSONAL INFORMATION BIDDING | · BIDDING FOR INFORMATION IS ONLY AVAILABLE FOR 1ST LEVEL ITEMS<br>└ADVERTISERS TARGETING LOWER DEPTHS ARE BILLED BASED ON 1ST LEVEL<br>· DISTINCTION BETWEEN IDENTIFIABLE INFORMATION (NAME, AGE, OCCUPATION, CONTACT ADDRESS) AND PSEUDONYMOUS INFORMATION (PREFERENCES, HOBBIES, ETC.)<br>· DISTINCTION BETWEEN 1ST LEVEL AND 2ND LEVEL INFORMATION<br>· DISPLAY MINIMUM/MAXIMUM PRICES SET BY ADMINISTRATOR<br>· SET IN JOG-SHUTTLE METHOD<br>· BIDDING IS ALLOWED ONLY ONCE A DAY, AND CURRENT AMOUNT SET IS REFLECTED AS OF 24:00<br>· MINIMUM UNIT FOR BIDDING IS 10P. |
| DETAILED INFORMATION | · TOTAL CUMULATIVE POINTS, USED POINTS, AVAILABLE POINTS, AND POINTS SCHEDULED TO EXPIRE AS OF TODAY'S DATE.<br>· DISPLAY DAILY POINT ACCUMULATION, USAGE HISTORY, AND AMOUNT<br>· LINK TO CASH WITHDRAWAL PAGE FOR POINTS.<br>· LINK TO POINT USAGE PAGE (GIFTICONS, PRODUCT PURCHASES, EVENT PARTICIPATION). |
| ACCUMULATION | · ACQUISITION WHEN REGISTERING INFORMATION OR SELLING INFORMATION.<br>· POINTS OBTAINED WHEN SELLING INFORMATION ARE PAID IN FULL FOR AMOUNT BID<br>· MINIMUM UNIT OF POINTS IS 10P.<br>· 10P IS WORTH 10 WON. |
| USAGE | · VALIDITY PERIOD IS ONE YEAR FROM ACQUISITION POINT. VALIDITY PERIOD GUIDANCE IS PROVIDED WHEN POINTS ARE ISSUED.<br>└ACCUMULATED POINTS ARE SET IN UNITS OF 10P FOR VALIDITY PERIOD.<br>└POINTS THAT HAVE EXPIRED ARE NOT REISSUED.<br>└EXPIRED POINTS ARE EXTINGUISHED AT 24:00. (POINTS ACQUIRED UNTIL DECEMBER 31, 22 CAN BE USED UNTIL DECEMBER 31, 23.)<br>· MINIMUM USAGE UNIT FOR POINTS IS 10P.<br>· POINTS CAN BE EXCHANGED FOR GOODS (GIFT CERTIFICATES, PRODUCTS).<br>· WHEN WITHDRAWING POINTS IN CASH, A 3.3% TAX IS DEDUCTED BEFORE PAYMENT.<br>· MINIMUM WITHDRAWAL UNIT FOR CASH POINTS IS 10,000P, AND WITHDRAWALS CAN BE MADE IN UNITS OF 1000P.<br>· CASH WITHDRAWALS OF POINTS ARE ONLY ALLOWED ONCE A MONTH, AND PAYMENT WILL BE MADE WITHIN 15 DAYS OF WITHDRAWAL REQUEST FOLLOWING MONTH.<br>· UNUSED POINTS CAN BE DEPLETED THROUGH AUCTIONS OR EVENT PARTICIPATION.<br>· ALL REMAINING POINTS ARE FORFEITED UPON MEMBERSHIP WITHDRAWAL. |

FIG. 40

SYSTEM FOR PROVIDING PERSONAL-INFORMATION-SHARING PLATFORM SERVICE BASED ON RIGHT TO DATA PORTABILITY

CROSS-REFERENCE TO RELATED APPLICATION

This application is a continuation of the International PCT application serial no. PCT/KR2023/015464, filed on Oct. 6, 2023, which claims priority of Korea application serial no. 10-2023-0005820, filed on Jan. 16, 2023. The entirety of the above mentioned patent applications is hereby incorporated by reference herein and made a part of this specification.

BACKGROUND

1. Technical Field

The present invention relates to a system for providing a personal-information-sharing platform service based on the right to data portability, and provides a platform that obtains consent to provision of personal information for use of the personal information, shares the personal information to distribute revenue, limits an information usage period using a sunset type safe number, and zeroes exposure of sensitive information.

2. Related Art

The right to data portability is the right of an information subject to request the transfer or transmission of him or her information to allow use of him or her information that is being processed by a personal data processor. The right to data portability aims to strengthen control of the information subject over personal information, ensure the freedom of choice in services, and grant the information subject the right to use information about him/her collected and managed by the personal information processor, and it expands and strengthens the right to access and copy requests regarding personal information that has been traditionally recognized. In Korea, the right to data portability is widely recognized as a method of promoting the circulation and utilization of personal information, and even in legislative terms, is discussed mainly regarding the use of personal information rather than strengthening the rights of information subjects. In particular, the right to data portability is interchangeably being used with the term "my data" and utilized as a basis for discussions regarding circulation and sharing of personal information.

A method of distributing revenue to individuals when revenue is generated through sharing of personal information has been researched and developed. In this regard, as related art documents, Korean Patent Publication No. 2022-0073899 (published on Jun. 3, 2022) and Korean Patent Publication No. 2017-0045786 (published on Apr. 28, 2017) disclose a configuration in which medical data is collected on the premise of user consent of a user terminal, and then generated as my data in the medical field through text mining and encryption, metadata is separated from the my data and managed in a duality form, and medical information is utilized using the metadata, and a configuration that provides an intermediary platform in which personal information data is separated into metadata and personal data, and for sharing, the personal data is converted into shared-use data and sold.

However, both cases involve configurations of big data or my data that is shared by removing all personal information, which is grade 1 information under the Personal Information Protection Act, with metadata, rather than a configuration of providing grade 1 personal information that is most needed by information users in practice. The right to data portability has significant risks of privacy infringement for information subjects and potential infringement on the information property rights of the personal information processor, and thus requires careful design, which leads to data mining business of providing data after complete deletion, de-identification, or anonymization of personal information. However, in this case, the utility value of personal information significantly decreases. The right to data portability may further deepen serious issues of personal information concentration and monopoly, cause indiscriminate overseas transfers of public information, and impose the transfer costs on the information subjects, resulting in only benefiting the revenue of platform giants while small and medium-sized businesses are likely to fall further into a personal information famine. Accordingly, there is a demand for research and development of a personal-information-sharing platform that enables sharing and protection of personal information.

SUMMARY

The present disclosure is directed to providing a system for providing a personal-information-sharing platform service based on a right to data portability, capable of obtaining consent to provision of personal information for use of personal information of a user from a user terminal to construct a database, allowing a requester terminal to view a desired object, and when uploading request posts from the requester terminal, allowing the requester terminal to post a purpose of collection and use of personal information, items of personal information to be collected, and a retention and usage period of personal information to make the information explicit, and for phone numbers among personal information, providing the request terminal with a safe number while limiting an information usage period in a sunset type to thereby restrict the period without specifying the phone number through the provision of the sunset safe number, and when revenue is generated from the requester terminal, allowing the remainder, excluding taxes and fees, to be identified as a history log from the user terminal. However, the technical objectives of the present embodiments are not limited to the above, and other objectives that are not described above may become apparent to those of ordinary skill in the art based on the following description and the accompanying drawings.

One aspect of the present invention provides a system for providing a personal-information-sharing platform service based on a right to data portability, the system including: a user terminal configured to consent to provision of personal information for use of the personal information, input at least one type of personal information for the use of the personal information, and set a price for the at least one type of personal information; a requester terminal configured to request personal information of the user terminal and view a preset item of personal information included in the personal information within a preset information usage period; and a platform-service-providing server including a consent storage unit configured to obtain consent to provision of personal information for use of the personal information from the user terminal, a database storage unit configured to receive at least one piece of personal information from the user terminal and store the received at least one piece of personal information, an auction unit configured to, upon receiving request of the requester terminal for the at least one piece of personal information, set a budget for using the at least one piece of personal information, and a period limit unit configured to, upon the requester terminal being awarded a bid, designate an information usage period, which is a viewing restriction, for the preset item of personal information among the at least one piece of personal information, and provide the information usage period.

The present invention can obtain consent to provision of personal information for use of the personal information of a user from a user terminal to construct a database, allow a requester terminal to view a desired object, and when uploading request posts from the requester terminal, allow the requester terminal to post a purpose of collection and use of personal information, items of personal information to be collected, and a retention and usage period of personal information to make the information explicit, and for phone numbers among personal information, provide the request terminal with a safe number while limiting an information usage period in a sunset type to thereby restrict the period without specifying the phone number through the provision of the sunset safe number, and when revenue is generated from a successful bid by the requester terminal, allow the remainder, excluding taxes and fees, to be identified as a history log from the user terminal.

DESCRIPTION OF EXEMPLARY EMBODIMENTS

Figure 1:
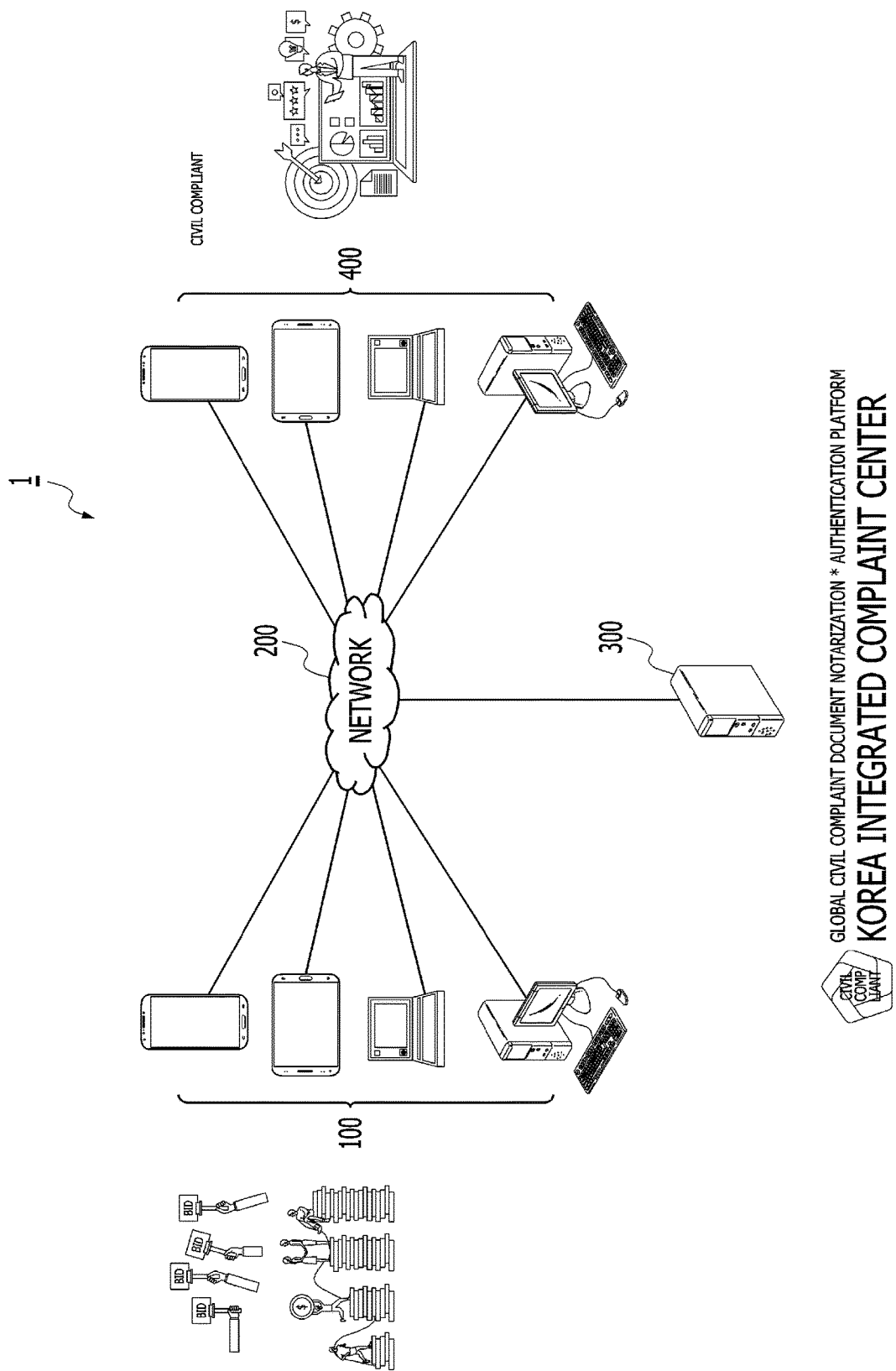
FIG. 1 is a diagram illustrating a system for providing a personal-information-sharing platform service based on the right to data portability according to an embodiment of the present invention.

Hereinafter, embodiments of the present invention will be described in detail with reference to the accompanying drawings so that those of ordinary skill in the art can easily implement the present invention. However, the present invention may be implemented in various different forms and is not limited to the embodiments described herein. In the drawings, parts irrelevant to the description are omitted in order to clearly describe the present invention, and similar reference numerals are attached to similar parts throughout the specification.

Throughout the specification, when a part is said to be "connected" to another part, this includes not only "directly connected" but also "electrically connected" with other elements interposed therebetween. In addition, when a part "includes" a certain component, it does not mean that other components are excluded and other components or one or more other features may be further included unless specifically stated to the contrary. The presence or addition of any number, step, action, component, part, or combination thereof is not precluded.

The terms "about," "substantially," and the like, as used throughout the specification, are used to refer to ranges in or close to the stated numerical values when manufacturing and material tolerances specific to the stated meaning are presented, and are used to provide an understanding of the present invention. Accurate or absolute numerical values are used to prevent unreasonable use of the stated disclosure by unscrupulous infringers. As used throughout the specification of the present invention, the term "step" or "step of" does not mean "step for."

In the present specification, "unit" includes a unit realized by hardware, a unit realized by software, and a unit realized using both. Further, one unit may be realized by using two or more pieces of hardware, or two or more units may be realized by one piece of hardware. It should, however, be understood that the term "unit" is not limited to a software or hardware element. A "unit" may be implemented in addressable storage media. A "unit" may also be configured to reproduce one or more processors. For example, a "unit" may include various types of elements (e.g., software elements, object-oriented software elements, class elements, task elements, etc.), segments (e.g., processes, functions, attributes, procedures, sub-routines, program code, etc.), drivers, firmware, micro-code, circuits, data, databases, data structures, tables, arrays, variables, etc. Functions provided by elements and "units" may be formed by combining them into a smaller number of elements and "units" or may be divided into additional elements and "units." In addition, elements and "units" may also be implemented to reproduce one or more CPUs in devices or security multi-cards.

In the present specification, some of the operations or functions described as being performed by the terminal, apparatus, or device may be performed instead in a server connected to the terminal, apparatus, or device. Likewise, some of the operations or functions described as being performed by the server may also be performed by a terminal, apparatus, or device connected to the server.

In this specification, some of the operations or functions described as mapping or matching with the terminal are mapped or matched with the unique number of the terminal or the identification information of the individual, which is the identification information (identifying data) of the terminal.

Hereinafter, the present invention will be described in detail with reference to the accompanying drawings.

FIG. 1 is a diagram illustrating a system for providing a personal-information-sharing platform service based on the right to data portability according to an embodiment of the present invention. Referring to FIG. 1, a system 1 for providing a personal-information-sharing platform service based on the right to data portability may include at least one user terminal 100, a platform-service-providing server 300, and at least one requester terminal 400. However, since the system 1 for providing a personal-information-sharing platform service based on the right to data portability shown in FIG. 1 is only an embodiment of the present invention, the interpretation of the present invention is not considered restricted to FIG. 1.

In this case, each component in FIG. 1 is connected generally via a network 200. For example, as shown in FIG. 1, the at least one user terminal 100 may be connected to the platform-service-providing server 300 via the network 200. In addition, the platform-service-providing server 300 may be connected to the at least one user terminal 100 and the at least one requester terminal 400 via the network 200. Additionally, the at least one requester terminal 400 may be connected to the platform-service-providing server 300 via the network 200.

Here, the network is a connection structure in which information exchange is performed between nodes such as a plurality of terminals and servers, and examples of the network include a local area network (LAN), a wide area network (WAN), the Internet (WWW: World Wide Web), wired and wireless data communication networks, telephone networks, and wired and wireless television communication networks. Examples of the wireless data communication networks include 3G, 4G, 5G, 3rd Generation Partnership Project (3GPP), 5th Generation Partnership Project (5GPP), Long Term Evolution (LTE), World Interoperability for Microwave Access (WiMAX), Wi-Fi, the Internet, a LAN, a wireless LAN, a WAN, a personal area network (PAN), radio frequency (RF), a Bluetooth network, a near-field communication (NFC) network, a satellite broadcasting network, an analog broadcasting network, a Digital Multimedia Broadcasting (DMB) network, and the like, but the network according to the present invention is not limited thereto.

In the following, the term "at least one" is defined as including a singular form and a plural form, and even without the term "at least one," each component may be present in a singular or plural form, and refer to a singular or plural form. Additionally, whether each component is provided in a singular or plural form may vary depending on the embodiment.

The at least one user terminal 100 may be a terminal that consents to provision of personal information using a web page, app page, program, or application related to a personal-information-sharing platform service based on the right to data portability and uploads personal information for use of the personal information. In addition, the user terminal 100 may be a terminal that receives a portion of revenue obtained from utilizing personal information from the platform-service-providing server 300.

Here, the at least one user terminal 100 may be implemented as a computer capable of accessing a remote server or terminal through a network. Here, the computer may include, for example, a navigation system, a laptop computer, a desktop computer, etc. equipped with a web browser. In this case, the at least one user terminal 100 may be implemented as a terminal capable of accessing a remote server or terminal through a network. The at least one user terminal 100 may be, for example, a wireless communication device that ensures portability and mobility, and may be any type of handheld-based wireless communication device, such as a navigation terminal, a personal communication system (PCS) terminal, a global system for mobile communication (GSM) terminal, a personal digital cellular (PDC) terminal, a personal handyphone system (PHS) terminal, a personal digital assistant (PDA) terminal, an international mobile telecommunication (IMT)-2000 terminal, a code division multiple access (CDMA)-2000 terminal, a W-CDMA terminal, a wireless broadband (WiBro) terminal, a smartphone, a smartpad, or a tablet PC.

The platform-service-providing server 300 may be a server that provides a web page, app page, program, or application related to a personal-information-sharing platform service based on the right to data portability. In addition, the platform-service-providing server 300 may be a server that obtains consent to provision of personal information for use of the personal information from at least one user terminal 100, and receives input of at least one type of personal information for use of the personal information to build a database. In addition, the platform-service-providing server 300 may be a server that allows the requester terminal 400 to search for personal information of desired conditions, allows the requester terminal 400 to upload request posts while specifying the purpose, scope, use, and period for use of the personal information, and allows the requester terminal 400 to set a price when using the personal information. In this case, the platform-service-providing server 300 may be a server that provides personal information to the requester terminal 400 when the bid is successful. In addition, the platform-service-providing server 300 may be a server that settles the remainder of the revenue generated from the auction, excluding taxes and fees, to the user terminal 100. In addition, the platform-service-providing server 300 may be a server that, for a phone number among personal information, provides a safe number in a sunset type not only to apply a safe number but also to limit the information usage period, and may be a server that, when an advertisement of the requester terminal 400 is sent to the user terminal 100 by email or postal mail, pays the user terminal rewards, such as points, only when evidence of opening the email or postal mail is entered to prevent abuse.

Here, the platform-service-providing server 300 may be implemented as a computer that may access a remote server or terminal via a network. Here, the computer may include, for example, a navigation system, a laptop computer, a desktop computer, etc. equipped with a web browser.

The at least one requester terminal 400 may be a terminal of an individual or company that wishes to use personal information using a web page, app page, program, or application related to a personal-information-sharing platform service based on the right to data portability. The requester terminal 400 may be a terminal that searches whether desired target information is present, and upon being awarded a bid, pays a winning bid amount to use personal information.

Here, the at least one requester terminal 400 may be implemented as a computer capable of accessing a remote server or terminal via a network. Here, the computer may include, for example, a navigation system, a laptop computer, a desktop computer, etc. equipped with a web browser. In this case, the at least one requester terminal 400 may be implemented as a terminal capable of accessing a remote server or terminal via a network. The at least one requester terminal 400 may be, for example, a wireless communication device that ensures portability and mobility, and may be any type of handheld-based wireless communication device, such as a navigation terminal, a PCS terminal, a GSM terminal, a PDC terminal, a PHS terminal, a PDA terminal, an IMT-2000 terminal, a CDMA-2000 terminal, a W-CDMA terminal, a Wibro terminal, a smartphone, a smartpad, or a tablet PC.

Figure 2:
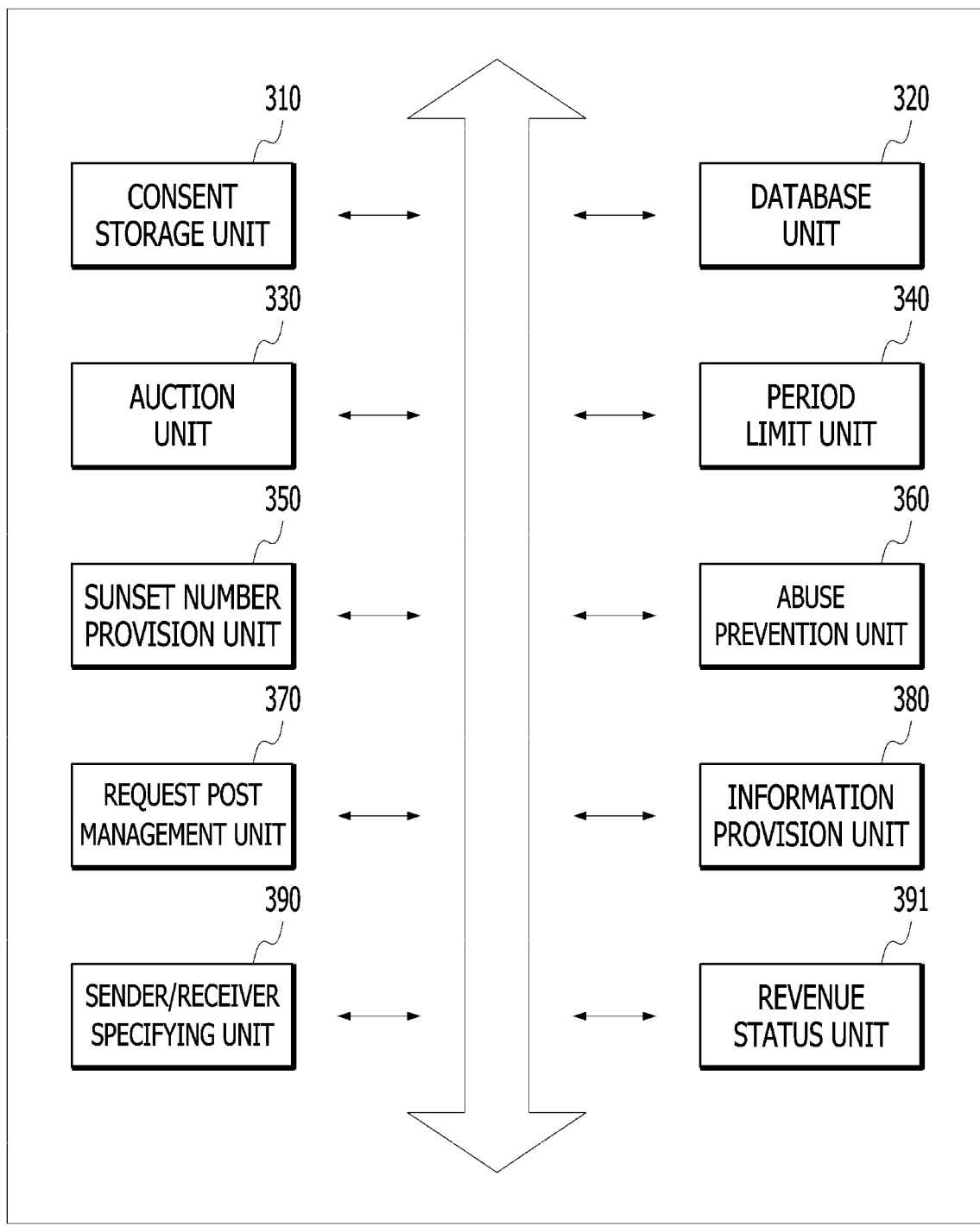
FIG. 2 is a block diagram for describing a platform-service-providing server included in the system shown in FIG. 1.

FIG. 2 is a block diagram for describing a platform-service-providing server included in the system shown in FIG. 1. FIGS. 3 to 19 are diagrams for describing an embodiment in which a personal-information-sharing platform service based on the right to data portability is implemented according to an embodiment of the present invention.

Referring to FIG. 2, the platform-service-providing server 300 includes a consent storage unit 310, a database unit 320, an auction unit 330, a period limit unit 340, a sunset number provision unit 350, an abuse prevention unit 360, a request post management unit 370, an information provision unit 380, a sender/receiver-specifying unit 390, and a revenue status unit 391.

The platform-service-providing server 300 according to an embodiment of the present invention or another server (not shown) operating in conjunction with the platform-service-providing server 300 transmits an application, program, app page, web page, etc. related to a personal-information-sharing platform service based on the right to data portability, to at least one user terminal 100, at least one requester terminal 400, and at least one information-providing server 500, and the at least one user terminal 100 and the at least one requester terminal 400 may install or open the application, program, app page, web page, etc. related to the personal-information-sharing platform service based on the right to data portability. Additionally, the service program may be run on the at least one user terminal 100 and at least one requester terminal 400 using a script executed in a web browser. Here, a web browser is a program that enables the use of web (WWW: World Wide Web) services and is a program that receives hypertext written in hypertext markup language HTML) and displays content. For example, the web browser may be Netscape, Explorer, Chrome, etc. Additionally, an application is an application program on a terminal and examples include an app running on a mobile terminal (a smartphone).

Referring to FIG. 2, the consent storage unit 310 may obtain consent to provision of personal information for use of the personal information from the user terminal 100. The user terminal 100 may consent to provision of personal information for use of the personal information, enter at least one type of personal information for use of the personal information, and set a price. In one embodiment of the present invention, when a requester (an information user) uses personal information of a user (an information provider), that is, when a user, Hong Dangmu, has been sorted according to the requester's conditions, a method for the requester to contact Hong Dangmu may be broadly divided into a phone number, an email and an address. In this case, phone numbers, especially mobile phone numbers, are highly sensitive personal information, but from the perspective of information users who purchase information, phone numbers are more important than anything and are essential contact points that need to be received. However, when transferring the mobile phone information of the information provider to the information user, there is a risk of exposure of the mobile phone information to misuse, various type of illegal distribution, and criminal use by the information user.

In this case, a temporary number referred to as a safe number is often used. In one embodiment of the present invention, the information user is provided with a safe number having a limited usage period rather than the phone number of the information provider, and the information user is provided with a sunset type safe number in which a period for using information is limited. A typical conventional safe number is provided as a method of generating a usage number through a combination of random numbers and then forwarding the usage number to match a specific number, and the method is generally provided in a form in which the user issues the safe number on his/her own and uses the safe number, but the platform according to the present invention implements a method in which a business operator generates a random number from a phone number of an information provider, and sets the phone number to be provided and connected to an information user through matching only for a certain period of time, and to be automatically deleted when the preset information usage period expires. In other words, the sunset type safe number may be regarded as a temporary sunset number that is unknown to an information provider and provided to an information user for a limited time. Also, in addition to sunset-type safe numbers, there are also sunset-type safe emails and sunset-type safe addresses. Sunset-type safe emails or sunset-type safe addresses operate, for example, similar to a DNS server that connects a domain with an IP, such that a sunset-type safe email and a sunset-type safe address are provided from the platform to the requester terminal 400, and the mail sent with the sunset-type safe email may be sent to the actual user's email, and sunset-type safe addresses may be subject to batch conversion and submitted to the post office.

The database unit 320 may receive at least one piece of personal information from the user terminal 100 and store the received at least one piece of personal information. In this case, a zero trust model that instructs a zero trust for managers or employees who manage the platform according to an embodiment of the present invention, that is, an instruction not to trust anyone, may be established to protect personal information in the database.

<Zero Trust Model>

The zero trust model, which means perimeterless security, is a model that assumes that there are attackers not only in external networks but also in verified internal networks, and seeks to achieve the goal of information security in all situations. The existing perimeter-based security model may implement strong firewall and gateway detection and thus effectively block external attackers on the internal network, but external remote workers, such as external telecommuters and cloud-based services, are exposed to threats and not safe. The zero trust model does not trust anything and considers that even users located on the internal network may become intruders. The zero trust model is a new security architecture that focuses on protecting data rather than maintaining the perimeter, and when access to data occurs, does not trust any user absolutely but continuously verifies who the user is, what the purpose of the user is, and what data is accessed by the user, and grants only the minimum required authority to the user, restricting unnecessary access to other data.

<Definition of Zero Trust Architecture>

The National Institute of Standards and Technology (NIST) introduced zero trust with the phrase [Never Trust, Always Verify], which is interpreted to mean not to trust anything and to always verify. In other words, zero trust is a new cybersecurity paradigm that prioritizes protecting organizational resources based on this principle. Zero trust moves away from the concept of the traditional security model of intensively monitoring the network perimeter and focuses on individual interactions between entities (users, data, computing equipment, etc.), such as who is using the service and what data is being accessed. Therefore, the zero trust model has the protection target including remote users outside the organization's network boundary as well as personally owned PCs and mobile devices, which are used to access the network but not owned by the organization.

The zero trust model does not trust any user absolutely. The zero trust model grants each user only the minimum authority required for tasks, and continuously checks the granted authority to restrict access to data outside of the authority. When a user attempts to access data, the zero trust model verifies who the user is, grants the minimum authority required for the task, and periodically checks the access authority. In order to implement a zero trust model, the structure needs to be designed as when constructing a building. From the network structure, such as the location of information security equipment and the location of servers, to specific security policies such as authentication methods and procedures for equipment and users, and access control methods, the detailed configuration of the entire organization network and the operations of security-related elements and interactions all need to be designed. The security structure design is referred to as a security architecture.

Zero-trust architecture (ZTA) defines seven principles for implementing a zero trust model. The zero trust model needs to design and implement the organization's infrastructure and business processes in accordance with the seven principles. The seven principles of ZTA are as follows: ① All data resources and computing services are considered assets that need to be protected. This principle means that all elements present in an organization's network are considered assets. An organization's network consists of various types of equipment. Data, services, data collection/storage devices, and software as a service (SaaS) are all considered assets needing to be protected, and even personally owned equipment, such as laptop computers and tablet PCs, of remote workers need to be considered assets to be protected when the organization's network is accessible from the equipment.

② All communications need to be protected regardless of its location in the network. This principle means that the trustworthiness of assets will not be evaluated based on the location of the network access. Security requirements need to be met according to the same procedures both in response to access from inside the network and access from outside the network. All communications need to be established in the most secure manner, satisfy confidentiality and integrity, and require authentication of the source of access, such as equipment or users. ③ Access authority to the organization's assets is granted on a per-session basis. When a user accesses an asset, the authority required for each task is determined in advance, and only the minimum authority required for the requested task is granted for a corresponding session. Whenever the session expires or another task is requested, the authentication process is repeated again and a corresponding minimum authority is granted. In order to implement this principle, there is a need to classify existing tasks, and precisely define required authorities at the initial design stage.

④ Access to assets need to be determined by a dynamic policy that makes a decision in consideration of various types of information, such as user identity information, applications, services, and the status of requested assets, and other operations or environmental requirements also need to be considered. In order to implement zero trust, assets held by the organization, members of the organization, and the access authority to the assets required for each member, and the like need to be defined, and a dynamic policy that collects and considers various types of information and grants required authorities needs to be applied. In this case, the information that may be collectable includes user identity information, asset information, operation information, environmental information, and the like, which may be organized as shown in Table 1.

TABLE

| User identity information | User identity information may include account-related characteristic information, media access control (MAC) or internet protocol (IP) address information, and authentication factors, such as fingerprints or one-time passwords (OTP). |

TABLE-continued

| Asset information | Asset information may include characteristics, such as information about software installed on all assets, along with the versions, network locations, information about times of requests, previous operation information, and installed authentication information (certificate or session information). |
| Operational information | Operational information may include measurement information about automated user and equipment analysis and patterns used |
| Environmental information | Environmental information includes information such as the requester's network location, connection and task request times, detected attacks, and the like. |
| Policy | A policy is a set of access rules generated based on information included in users, assets, programs, etc., and it needs to be developed to meet the requirements of the business process of the organization and the level of risks permitted by the organization. The principle of least privilege that only the minimum necessary authority is granted is applied to appropriately limit access and verification authority. |

⑤ Organizations must not trust any assets and must monitor and measure the integrity and security status of assets. When evaluating requests for assets, organizations need to evaluate the security statuses of the assets. A system (continuous diagnostics and mitigation (CDM)) that continuously diagnoses the conditions of assets and mitigates risks need to be established. When some assets have already been attacked or have known vulnerabilities, the assets may be granted different authorities than other secure assets. For example, a personal device evaluated as having malware installed therein may be denied access to the network. ⑥ Before allowing access to assets, the authentication and access authorities of users and devices need to be dynamically and strictly checked. ⑦ Organizations need to collect as much information as possible, such as the security statuses of assets, network traffic and access request information, communication status, and the like, and use the information to improve security. In zero trust architecture, none of the principles is limited to a specific technology. Depending on the organization's situation, zero trust architecture may be designed and implemented with various elements only to meet the seven principles. <ZTA logical core components>

One of the representative models of the zero trust model shows components of zero trust and the interaction relationships between the components. Policies may be determined and applied at a policy decision point (PDP) and a policy enforcement point (PEP) in a control model. Here, the PDP is further divided into a policy engine (PE) and a policy administrator (PA), and the PE makes a decision on access requests to assets. In addition, the PE also uses an organization's policies and collected information to make approval or rejection decisions on dynamically received requests. The PA implements the decisions of the PE. The PA, when the PE makes an approval decision, opens a session between the requester and the assets to connect communication, and when the PE makes a rejection decision, closes the session to block the communication, thereby managing the application of policies, such as granted authorities, e.g., users' sessions, authentication statuses, and the like. In other words, the PDP is a part that determines policies and manages application of the policies. The PEP may be regarded as a gatekeeper who opens and closes communication according to instructions received from the PA, which manages policies, and also a logger who records access.

ZTA implemented in the example model uses the three components to enable authentication, authority management, and recording. There are a number of methods for an organization to implement ZTA for a workflow of the organization. Basically, ZTA is implemented to meet the seven principles of ZTA, but different ZTAs may be implemented in various methods depending on the characteristics of each organization. For example, an ID of an actor may be used as a key component in policy generation, and in this case, access to data of the organization may be monitored to perform approval/denial according to the ID and attributes assigned to the ID. Personal data may be placed in special network devices, such as intelligent switches/routers, next-generation firewalls, and special-purpose gateway devices to be logically and physically separated such that all personal data is protected. Using a software-defined perimeter (SDP) method, when the PE determines how to configure the network, the PA may reconfigure the network, and the client may request access from the PEP configured by the PA for the PEP to perform approval on the request. In conclusion, ZTA may be implemented to satisfy the seven principles according to characteristics suitable for each organization without a need to be confined to any restrictive methods.

<Trustworthiness Algorithm>

In ZTA, a PE serves to determine whether to apply a policy. When making a determination, a PE needs to evaluate the trustworthiness of the user accessing assets and the assets. Based on the evaluated trustworthiness, the policy applied by the PE varies. An algorithm of trustworthiness evaluation evaluates elements listed in Table 2 below.

TABLE 2

| | |
|---|---|
| Access request | Key information about the access request itself is evaluated and reflected in trustworthiness. Information about an environment requesting access, such as operating system (OS) information, information about software requesting access, a security patch level, and the like may also be evaluated. |
| Access subject database | Information about whether a subject, such as a user or program, requesting access to assets is present in a database of access subjects maintained by the organization and the subject has appropriate authorities is compared to evaluate trustworthiness. |
| Asset database | Information, such as OS information, installed SW information, security patch level, integrity, location in network, and geopolitical location, of organization-owned or privately owned devices is compared with a database that maintains information about assets to evaluate trustworthiness. |
| Asset requirements | The requirements needed to access assets are determined by the data held by the assets and the roles of the assets in the organization's business processes. The requirements are a factor that determines whether the assets are accessible depending on the trustworthiness. |
| Threat information | Using information about general threats and active malicious code threats, threat information is collected from communication records or actions of a subject currently requesting access and from specific files stored in the assets, and the threat level is evaluated and reflected in trustworthiness. |

The PE evaluates trustworthiness by considering the above five factors and determines whether an access subject able to access assets. The trustworthiness algorithm may also be implemented in various methods. Representative examples include a criterion-centric method and a score-centric method, as well as a single trustworthiness algorithm method and a multiple trustworthiness algorithm method. The criterion-centric method involves evaluating trustworthiness based on whether the access subject exceeds a specific criterion while the score-centric method involves evaluating trustworthiness by calculating the access subject's trustworthiness using a score method. The single trustworthiness algorithm method involves individually evaluating the trustworthiness of each request, and the multiple trustworthiness algorithm method involves evaluating trustworthiness by considering communication records and evaluation records of the request subject. There is no right answer when determining a trustworthiness algorithm. Since the environment of every organization is different, the most appropriate method for the environment may be selected and implemented, as when designing the logical core components of ZTA. In summary, zero trust protects all data resources and computer services of an organization by not trusting any component present on the network. Here, components are all elements present in the network, such as users and devices connected to the network, servers located in the internal network, network equipment, information protection equipment, programs running on each piece of equipment, and the like. In other words, even the components inside the network are not trusted. Zero trust architecture does not determine trustworthiness based on the network connection location, and when access to individual data or assets occurs, the identity and authority of the access subject are verified and only the minimum authority required for a requested task is granted, thereby managing access on a per-session basis for each task. Thereafter, zero trust architecture is provided to, when the task is completed, terminate the corresponding session, and when another task is needed, grant authority only after re-obtaining authentication. In order to implement the concept of zero trust, there is a need to periodically monitor and measure all assets for integrity checks, infection status, etc., and collect various types of information, such as user identity, service request information, asset status, etc., and as much information as possible, including network traffic and communication status, etc.

<Personal Information Encryption>

Encryption algorithms that may be used to encrypt databases may be classified into symmetric key (secret key) algorithms, public key algorithms, and hash algorithms depending on the characteristics of the key. In the case of database encryption using a name or social security number, for which encryption and decryption continuously occur each time a query is processed, a fast algorithm is appropriate, and in a case using items which do not require decryption such as passwords, a hash algorithm is appropriate. In one embodiment of the present invention, a user's personal information may be encrypted and decrypted using the symmetric key algorithm, such as an AES or DES algorithm. In addition, the present invention does not exclude public key or hash algorithms, or hybrid encryption that combines the public key or hash algorithms.

The auction unit 330 may, when the requester terminal 400 requests at least one piece of personal information, allow setting of a budget for using the at least one piece of personal information. For example, it may be assumed that the requester targets women in their 20s and 30s living in Seoul and requires personal information of the women in their 20s and 30s. In this case, the auction unit 330 may sort personal information according to conditions requested by the requester terminal 400, and when the budget is entered by the requester terminal 400, arrange the personal information in ascending order based on prices, which are set by the user terminal 100 to sell the personal information, and allow a certain number of pieces of personal information that is purchasable within the budget by the requester terminal 400. When the budget is 100,000 won and the price of one piece of information ranges from 100 won to 500 won, the auction unit 330 may calculate how many pieces of personal information the requester terminal 400 can buy with 100,000 won. The requester terminal 400 may increase the budget when the number of information providers related to a desired item is insufficient, and may decrease the budget when the number of information providers related to the item is excessive. There may be various types of personal information items, and the auction unit 330 may provide a search filter with an AND operator and an OR operator to specify a case in which personal information items requested by the requester are met at the same time or a case in which one personal information item corresponds to only one condition, etc. Accordingly, the requester may set an AND condition or OR condition. Also, for a condition where subtraction is desired, a NOT operator may be added.

Figure 5:
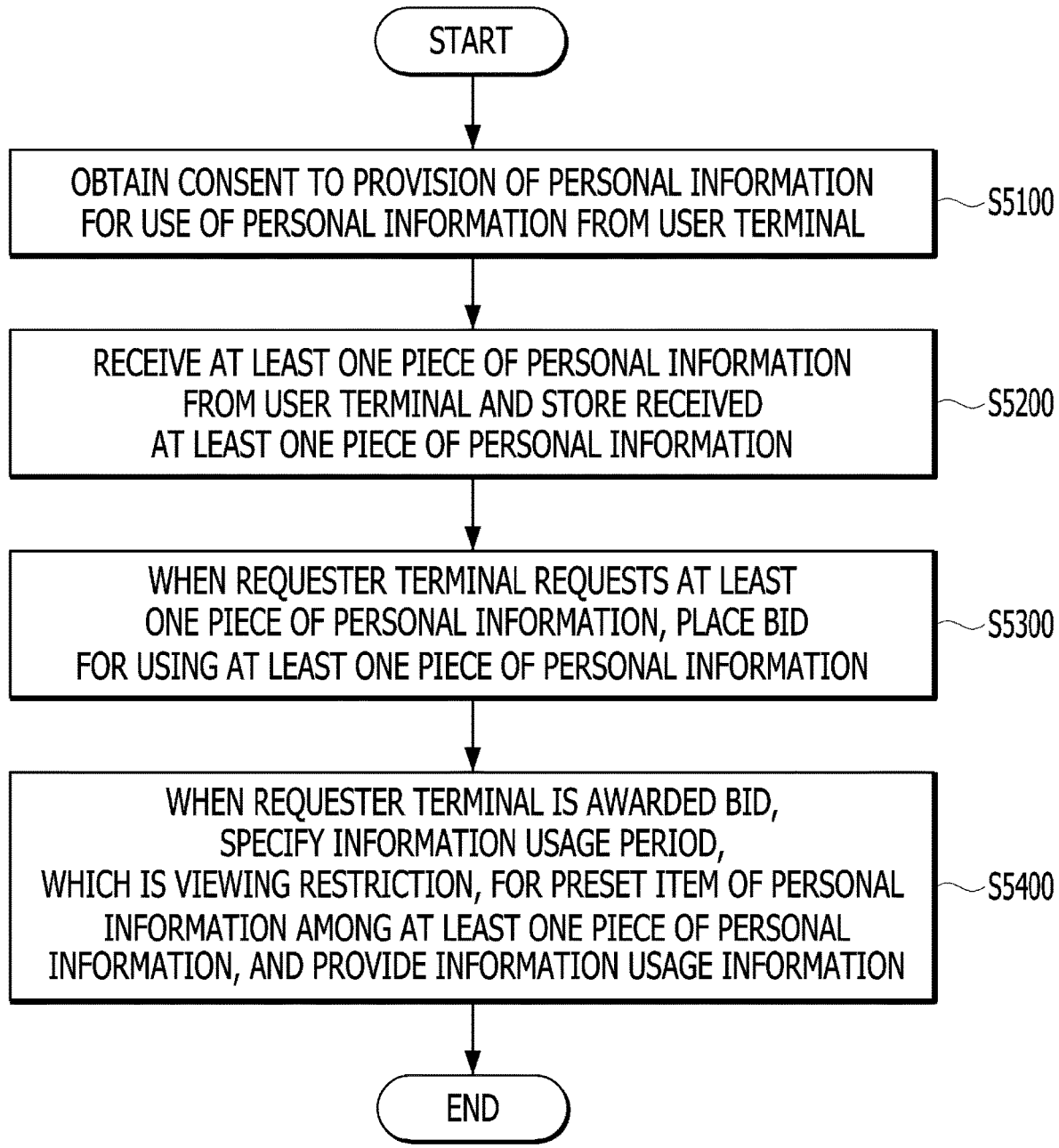
FIG. 5 is a flowchart for describing a method of providing a personal-information-sharing platform service based on the right to data portability according to an embodiment of the present invention.

In this case, the user terminal 100 may set a price for each item of personal information, as shown in FIGS. 5 and 6. For example, the user terminal 100 may enter a name, a sex, a date of birth, a place of birth, etc., and perform authentication to verify whether the information is fake or real, as shown in FIG. 7. Information that has not been verified has a limitation in price setting (bidding). This is because information that is certain to be real is more valuable than uncertain information that is not known to be fake or real. In addition to information that may specify identity, preference information, such as a preferred food and preferred style of travel, is also valuable information to advertisers, and thus the auction unit 330 may provide a function of collecting information about preferences and setting the prices on the information, as shown in FIGS. 8 and 9. When personal information is provided as described above, information indicating how many days the advertiser may contact the user and the like may be provided, as shown in FIGS. 10 and 11, and the points (revenue) earned as the advertiser purchases the user's information may be usable in a point shop as shown in FIG. 12, and exchange for cash may be possible, as shown in FIG. 13, or the points may be managed on my page as shown in FIG. 14. In addition, the sales status of my information may be listed as shown in FIG. 15, and the price setting may be performed as shown in FIG. 16. When identity authentication is verified with civil application documents as shown in FIG. 17, verification may be performed by various civil application documents being issued and the civil application documents being compared with personal information, and in the case of items for which issuance of civil application documents is not performable, e.g., preferences, the items may be verified by selecting an acquaintance and allowing the acquaintance to verify the items, that is, through an acquaintance authentication process, as shown in FIG. 18. Also, functions as shown in FIG. 19 may be provided, but the present invention is not limited thereto.

In this case, the auction unit 330 may build an auction model using an agent-based model (ABM) to simulate a competitive bidding market. In this case, the agent is a company, that is, a bidder. A successful bidder may be awarded a bid through a quantitative evaluation and a bidding amount. An ABM is a system modeling approach composed of autonomous and interactive agents. Agents are set as constituent entities having key properties and behavioral rules in the system and are simulated to interact in a given environment. Within the auction system, economic entities make choices to maximize profits by considering the actions of competitors and attributes thereof, and results derived from the choices in turn affect the profits of each entity. Since direct interaction of agents in an auction system is a form of collusion, interactions are limited to situations in which outcomes of other agents indirectly affect a bidding result.

<Bidder and Bid Price Setting>

The price determination method for competitive bidding is a discriminatory pricing method, which may be set such that the bid prices of bidders directly become the winning prices. Therefore, it is reasonable for bidders to bid by adding a margin to the bid prices. However, adding excessive margins may decrease the probability of winning the bid, so it is required to consider an appropriate bid price.

$$E(\pi(b)) = (b-c)\sum_{j=0}^{n_s}\binom{n-1}{j}F(b)^j(1-F(b))^{n-1-j} \quad \text{[Equation 1]}$$

Equation 1 obtains a successful bidder's own expected revenue, in which a bid price that maximizes the expected revenue is obtained using an optimization algorithm. The successful bidder's expected revenue, x, is calculated by multiplying the probability of winning the bid by the profit when the bid is won. The probability of winning a bid is calculated using ordinal statistics, in which, assuming that the number of competitors excluding oneself in the auction is n−1 and the number of successful bidders is ns, the competitor with the $ns^{th}$ lowest bid price among the n−1 competitors needs to have a bid price higher than the successful bidder's bid price b. A cumulative distribution function F corresponds to a bid distribution of competitors assumed by a bidder, and represents the probability that the competitor's bid price bj is lower than the bidder's bid price b. Therefore, 1−F(b) represents the probability that the bidder's bid price is lower than competitors' bid prices. The profit from winning the bid is calculated by subtracting a business cost c of the bidder from the bidder's bid price b. Using this equation, companies may set their own bid prices and thus have guidelines for bid prices.

The period limit unit 340 may, when the requester terminal 400 is awarded a bid, specify an information usage period, which is a viewing restriction for a preset item of personal information among at least one piece of personal information, and provide the information usage period. The requester terminal 400 may request personal information of the user terminal 100 and view a preset item of personal information included in the personal information within a preset information usage period.

The sunset number provision unit 350 may replace a phone number among personal information with a sunset type safe number and provide the sunset type safe number during the information usage period. The term, "sunset type," similar to sunset clauses, refers to specifying that the safe number ceases to be effective after a certain period of time unless additional action is taken to extend the period of validity. Instead of the term "sunset clauses," the term "sunset type" may be used in connection with various concepts, such as sunset law, sunset system, sunset legislation, sunset provision, and sunset regulation. Although they may be slightly different, the concepts imply that when a specific deadline is set and no special measures are taken, the safe number is abolished. In other words, it is suggested that the safe number may be used only for a preset period, and after that, the safe number is deleted, and messages or calls are prevented from being further sent to the user terminal 100.

The preset period is an information usage period, and since the purpose, use, and period are required to be specified when using personal information according to the Personal Information Protection Act, the setting of the period results in eliminating the intermediary connecting from the requester terminal 400 to the user terminal 100, that is, serving to break the intermediate bridge. In this case, the safe number is a randomly extracted number, and is mapped in the form of [user phone number-safe number] such that when the requester terminal 400 makes a call or sends a message to the safe number, the call or message is forwarded to a user's phone number. Similar to the safe number for a phone number, a safe email address and a safe address (a postal address) may also be set in the same method as the safe number. As a result, the requester may contact the user only within a preset information usage period, and when the information usage period expires, may no longer contact the user.

The abuse prevention unit 360 may, when an email or address is provided among the personal information, allow a unique identification code, which is output when the email of the user terminal 100 is opened or which is printed or inserted in a mail envelope delivered to the address, to be entered in order to pay the user terminal 100 points according to the provision of personal information. Abuse is an action with an illegitimate purpose, that is, a purpose of causing harm to others or benefiting oneself, and the notion that a user has received a portion of revenue is based on provision of his or her personal information. However, receiving a portion of revenue without engaging in activities using personal information, for example, without viewing an advertisement or opening a mail, is an act against the interests of the requester. Accordingly, the abuse prevention unit 360 may identify the user terminal 100 through device fingerprinting, and monitor a case of generating a fake account to repeatedly obtain rewards in the user terminal 100 or repeating actions required to obtain rewards using a MacroBot in the user terminal 100, to detect the case and treat the user account as an abuser. When a large number of different devices are used rather than the same device, the abuse prevention unit 360 may identify whether the devices are linked to the same or similar GPS or WIFI, thereby monitoring and extracting malicious users.

<Conditions for Device Fingerprinting>

Among device information, browser properties appear relatively consistent, key components to classify meaningful values for device identification may be selected, and the conditions for the selection may include applicability of the domestic Internet environment, ease of implementation, selecting of a common identification value for each device, avoiding of anti-fingerprinting, and minimizing of privacy infringement. The condition for selecting identification values and the condition for a device detection method are as follows.

First, it is required to apply the domestic Internet environment. In order to more accurately identify device information of domestic users, it is required to assign weights appropriate to the domestic Internet environment. In most devices used domestically, information, such as language and time zone, often matches, so it is required to lower the weight of the corresponding attribute value in a method of identifying devices. Additionally, in the case of mobile devices, it may be required to dynamically change condition values, such as lowering the weight for the connection IP. This may vary depending on the characteristics of each web service. Second, ease of implementation is required. It is required to use minimal code in collecting device information, such as JavaScript, Flash, or canvas fingerprinting on web services, to minimize user accessibility and slowdown when accessing the website. In fact, implementing a large amount of JavaScript may result in collection of unnecessary information or inevitable slowdown of website page landing speed, so there is a need for a method that minimizes such drawbacks.

Third, it is required to select an identification value common to device browsers. There are identifiable values and non-identifiable values in a browser of a user device. Since collectable items differ depending on the browser used, there is a need for a technology capable of selecting a value that may provide accurate results and be identifiable and that can be applied to mobile devices in common. Fourth, it is required to avoid anti-fingerprinting technology. Browsers that hide header values and various tools that may hide tracking are provided to prevent privacy violations. Recently, the use of the Tor network and Tor browser has been increasing, so it is required to detect attack patterns in which device attribute values are continuously modified through the use of anti-tracking tools or proxies, and prepare additional security procedures. Anti-fingerprinting needs to be avoided by adding a method of newly tracking information that may not be collectable from user devices or by applying a technology of verifying the information.

Fifth, it is required to minimize privacy infringement. Only the minimum amount of information required for identifying the device needs to be collected such that information is not used for purposes other than identifying the user or the device itself. Since there may be a situation in which the collected information itself may become a subject of controversy regarding privacy infringement, it is required to notify users of content of legal collection and hash and store the collected information, providing measures for basic privacy protection.

<Optimal Information Collection Model>

In order to implement information collection in an actual web service based on the optimal information collection model, it is required to operate a browser collection script for device fingerprinting on the web server, combine characteristic values using a fingerprinting server to generate a device fingerprinting ID, and track behaviors based on the generated device fingerprinting ID such that suspicious devices are tagged or blocked, or requested to perform additional authentication, such as ARS authentication or domestic identity authentication, depending on the type of a service in management.

<Device Scoring to Prevent Online Fraud>

Although attack methods such as online fraud for corporate web services vary depending on the industry, most web services that use accounts are exposed to the same risks. In order to respond to such attacks, taking traditional defense measures while identifying devices connecting to the network is considered an important technique that recognizes potential risks posed to web services and defends against attacks. Attack prevention based on devices may play a significant role in effectively preventing attacks in online environments and providing safe services to trustworthy users. Typically, an attacker's device is not configured for only one web service. Having more accurate data about devices makes it easier to assess risks and stop attacks. Identifying devices may serve as the first line of defense against online attacks and may be a powerful tool for identifying high-risk behavior patterns.

<Device Scoring Model>

A method of identifying a device fingerprinting ID (hereinafter referred to as a device ID) and detecting a behavior thereof may be achieved using an identification method in which a unique ID is generated with cookies, which is the current technology being used, and the unique ID is combined with a device fingerprinting ID. Depending on the site, combining unique values held by the web service company, such as a unique serial number or a user's account ID, may result in a more valuable detection method. This method involves using two unique keys.

The first key being used is a cookie-based product unique identifier (PUID). The first key is a value generated based on a cookie when a user's web browser first accesses a web service, and is the same concept as a universally unique identifier (UUID). The key may be used to check traces of whether a user's browser has accessed a website. The second key being used is a device fingerprint unique identifier (DFID) generated using a browser's unique values. The second key may be generated by hashing each value of the optimal information collection model. For example, when hashing with SHA256, a unique key of 64 characters is generated. The key is stored in available storage spaces, such as browser cookies, local storage, and HTML5 Web SQL on the user's device, and is subject to a comparison process upon access to a website. Different criteria may be applied here depending on the detection level and policy of each site.

When the user terminal 100 first accesses a website, a device fingerprinting process begins to generate a PUID based on a cookie value of a user's browser. Separately from the PUID, the system generates a DFID through a process of obtaining device information of the user. The two keys are stored in the database of the user device and the device fingerprinting system or web service and are used for a subsequent comparison. When a user's PUID is present, but a DFID is not present or does not match, a new DFID is generated and the change is recorded, the device is subject to enhanced monitoring through tagging or blocking, and depending on the type of the service, using a process of re-identifying a user with an additional authentication method, such as ARS authentication or domestic authentication, may be effective. For security management, the two keys, the PUID and the DFID, may be appropriately used in conjunction with management of the access IP address of devices already in use or management of the history of logged-in accounts.

<Connection Between Device and Account>

For application to internal corporate web services, devices and account information may be associated with each other, and the connection may be tracked, which may provide a useful tool to detect collaborating cyber attackers. Organized and sophisticated hacking groups often use different types of devices located in multiple locations, and when they log in to the same account, the association information may be tracked and managed, which enables much more sophisticated detection compared to current defense methods that performs detection based on IP addresses. For example, when using the same mobile gateway IP, it may be impossible to detect or block the activity, but when one device generates multiple accounts in succession or when multiple devices all use the same account, it may be possible to detect the activity. Such devices and user accounts may be managed for risk through separate scoring management.

The request post management unit 370 may upload request posts of a requester requesting provision of personal information, arrange the request posts to be divided according to pre-set categories, and list up the request posts for each category, sorted in descending order based on cumulative rewards.

The information provision unit 380 may provide the user terminal 100 with a database for use of personal information and statistical data including bidding amounts, and provide the maximum, average, and minimum values of the bidding amounts. The bidding may be setting of a price for each item of personal information that may be settable by a user. In other words, the bidding involves setting a price at which a user desires to sell his/her own information. The platform of the applicant of the present invention (Korea Integrated Civil Petition Center Co., Ltd.) issues documents for each individual through various civil service document issuance agencies, and information verified as such, that is, verified information, may be set at a higher price, and unverified information may have an upper limit on the amount. In addition, guidelines regarding the maximum and minimum values of verified personal information may be provided, allowing users to set the value of their personal information themselves.

The sender/receiver-specifying unit 390 may, when request posts requesting provision of personal information by a request are uploaded from the requester terminal 400, specify the name of a requesting company and the purpose of use of the requester as required information, and allow the requester to select at least one of a phone number, an email, and an address and enter a sender's name such that the sender's name is made explicit. Because a personal information processor who processes personal information must process personal information appropriately to the extent required for the purpose of processing personal information, and must not use the personal information for other purposes, it is required to state the purpose of use, and in order to prevent indiscriminate spam from being delivered to users, it is required to state a sending number when a phone number is used, state a sending email address when email is used, and state a sending address when postal mail is used.

The revenue status unit 391 may, when providing revenue obtained by providing personal information in the user terminal 100 as a history log, provide the requesters, purchase items, and bid prices by date, and provide revenue statistics by date, month, year, requester, and item, and provide a history of total revenue amounts, withdrawals and balances.

Hereinafter, an operation process according to the configuration of the above described platform-service-providing server shown in FIG. 2 will be described in detail with reference to FIGS. 3 to 19 as an example. However, it will be apparent that the embodiment is only one of various embodiments of the present invention and the present invention is not limited thereto.

Figure 3A:
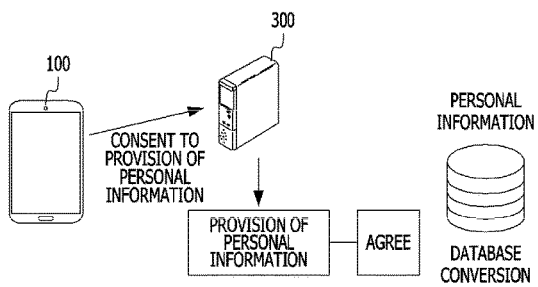
FIGS. 3A to 4O are diagrams for describing an example in which a personal-information-sharing platform service based on the right to data portability is implemented according to an embodiment of the present invention.
Figure 3A:
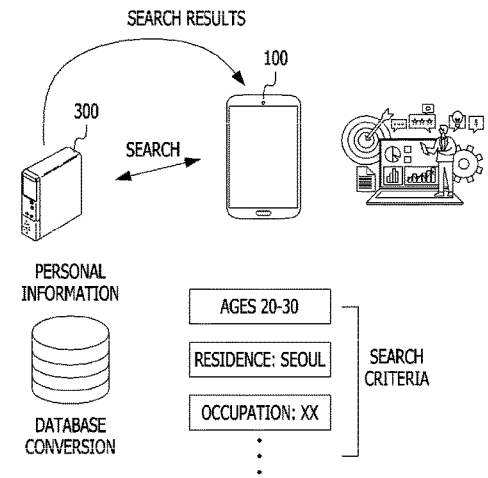
Figure 3A:
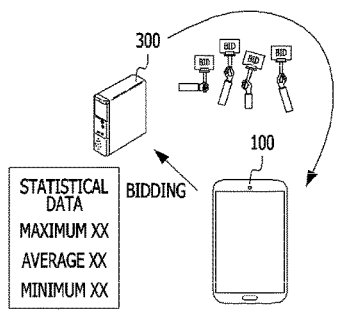
Figure 3A:
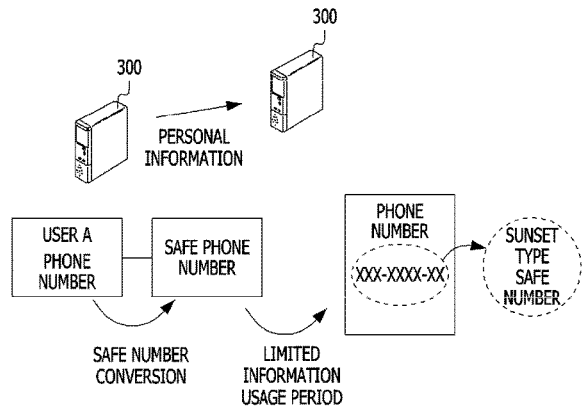
Figure 3B:
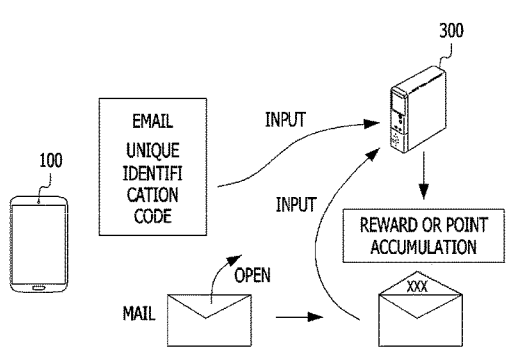
Figure 3B:
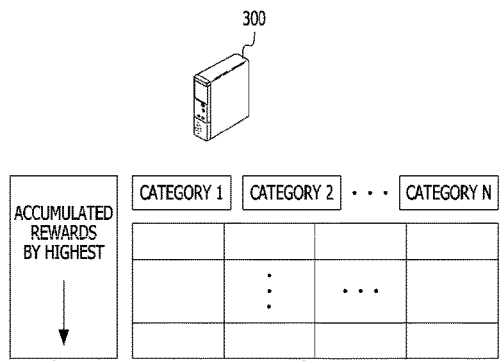
Figure 3B:
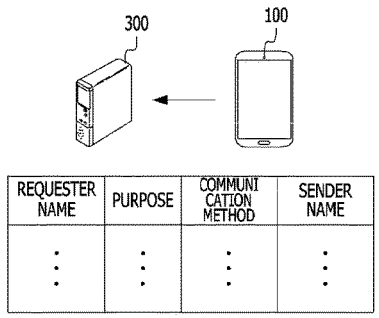
Figure 3B:
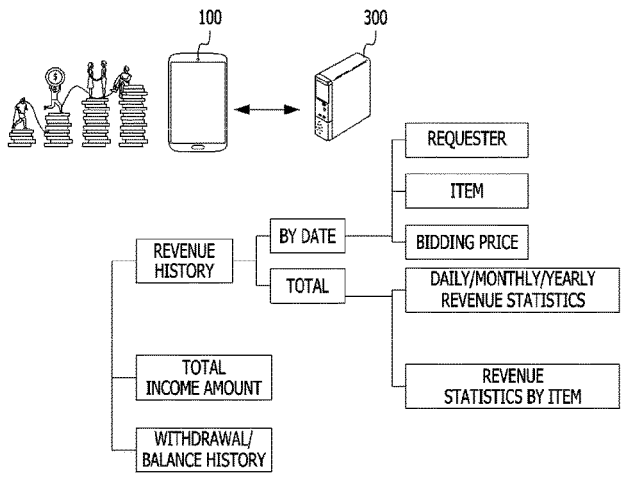

Referring to FIG. 3A, the platform-service-providing server 300 is implemented to, when the user terminal consents to provision of personal information and uploads personal information, convert the personal information into a database, thereby building a personal information database, and referring to FIG. 3B, the platform-service-providing server 300 allows the requester terminal 400 to search for desired personal information in the database, in which case, the platform-service-providing server 300 processes the personal information in a blurred, anonymized or pseudonymized form, or shows only matching numbers, thereby preventing personal information from being directly provided. Referring to FIG. 3C, the platform-service-providing server 300 may allow the user terminal 100 to set the price (bidding), and when the requester terminal 400 specifies a target condition and the number of pieces of personal information according to the budget and then purchases personal information, set the requester terminal 400 as a successful bidder. Referring to FIG. 3D, the platform-service-providing server 300 is implemented to, when the requester terminal 400 is awarded a bid, provide personal information to the requester terminal 400, in which when a phone number, an email address, or a postal address among the personal information is requested, the platform-service-providing server 300 may provide an intermediary having a preset period, such as a safe number, a safe email address, or a safe postal address, that is, an intermediary having a limited information usage period, thereby preventing the user's information from directly reaching the requester's hands.

Figure 4F:
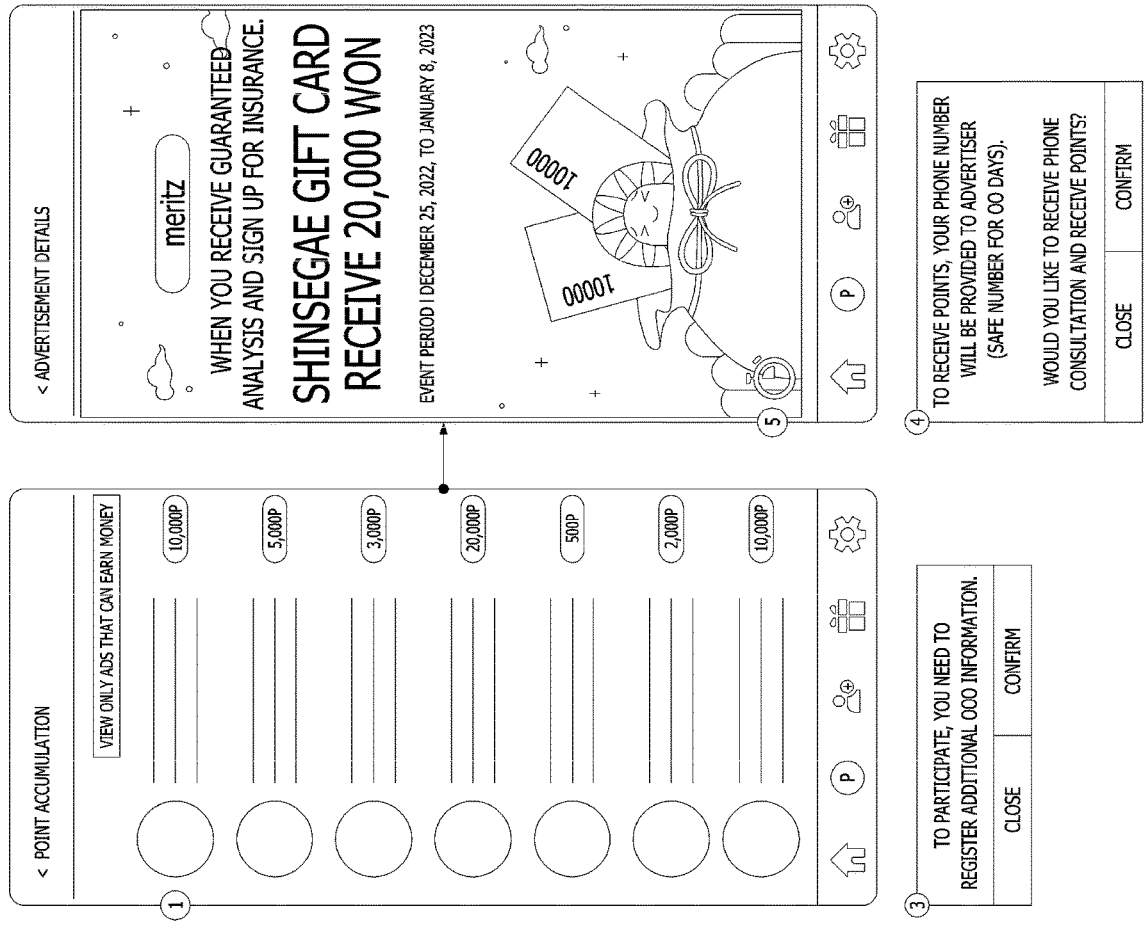
Figure 4H:
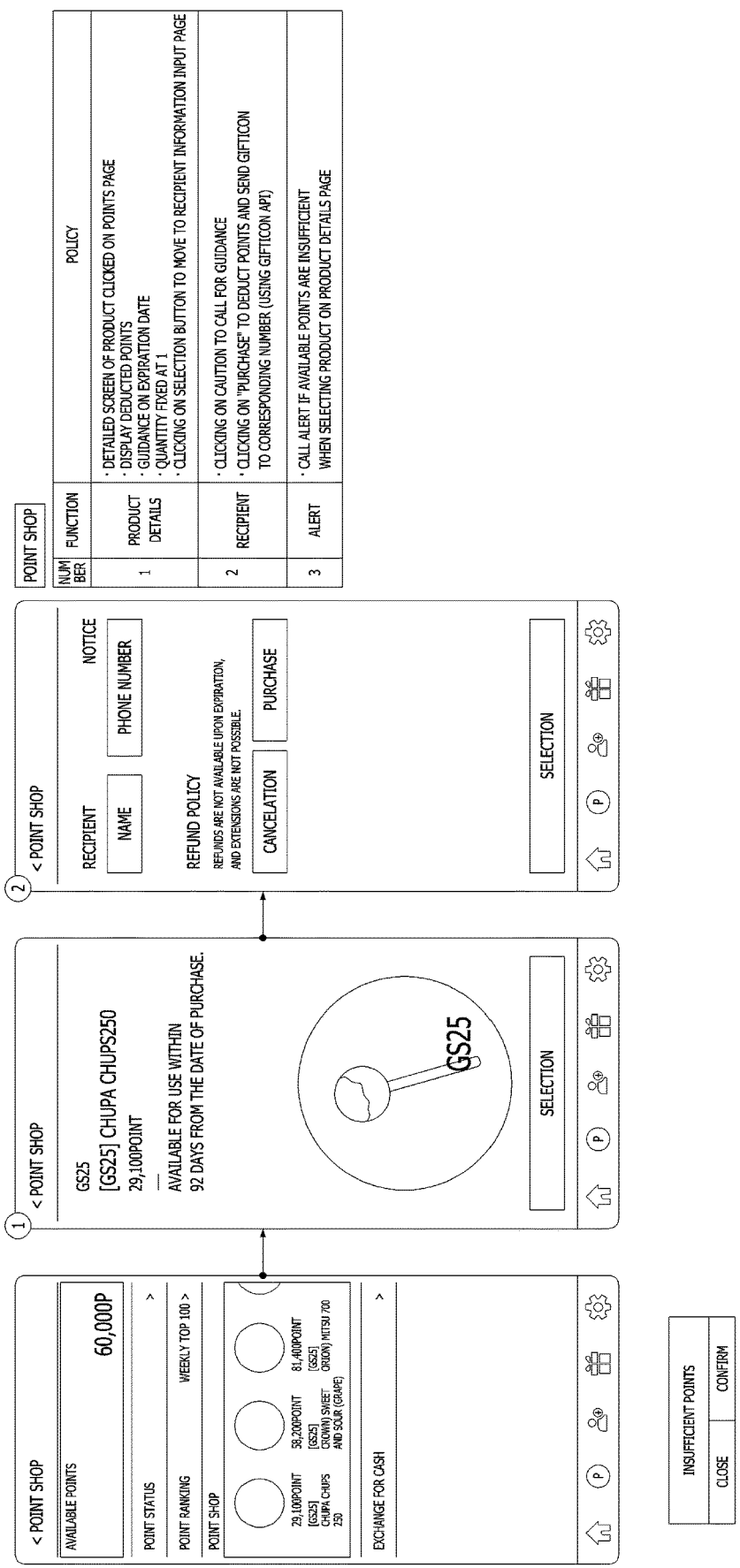
Figure 4I:
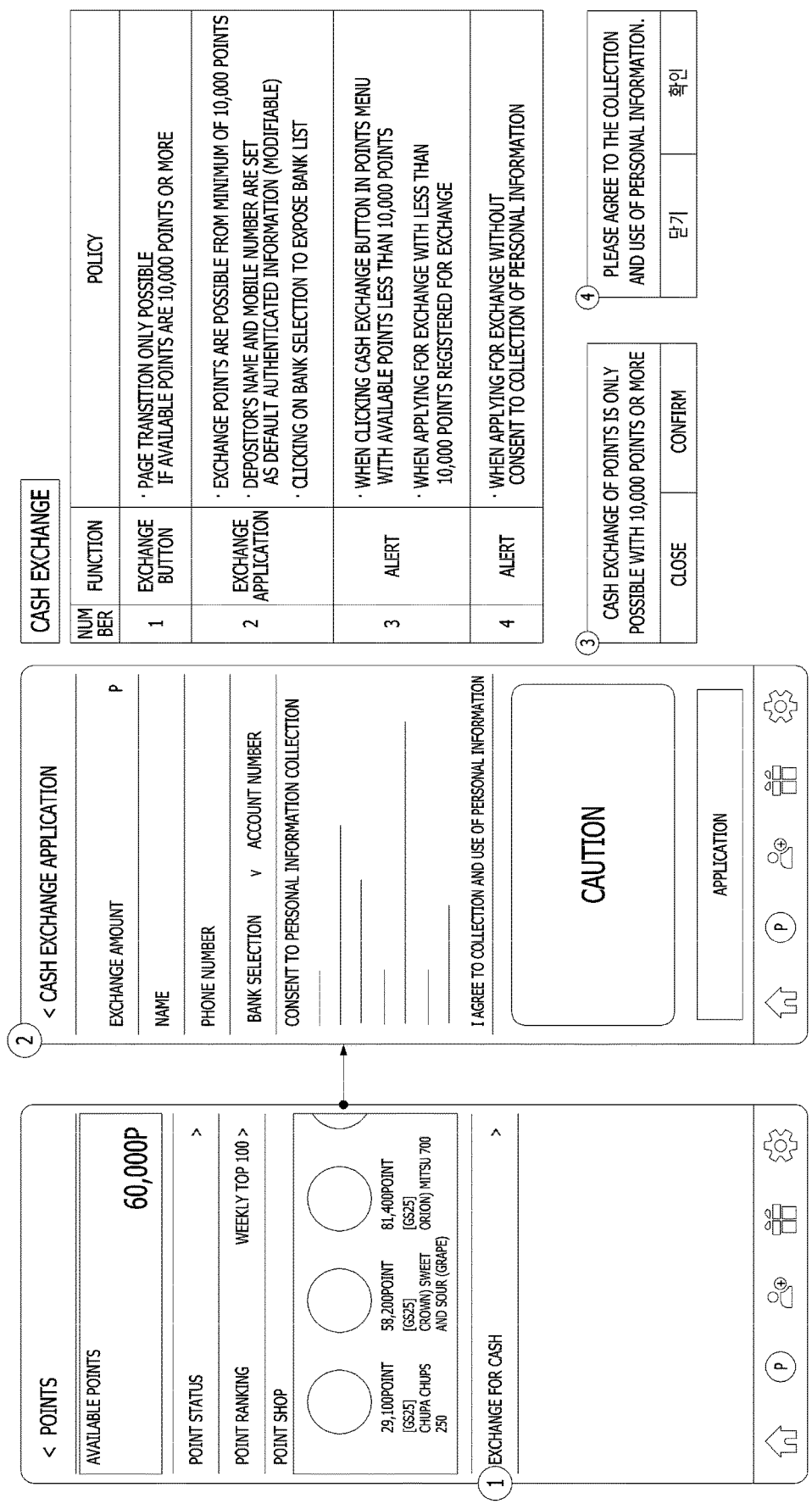

Referring to FIG. 4A, the platform-service-providing server 300 may, in order to prevent abuse on the user terminal 100, check whether the user has entered an incorrect phone number, email, or postal address through an authentication number in the case of a phone number, an email verification in the case of email, and verification of mail sent to a postal address in the case of a postal address. In addition, in order to pay a reward to the user terminal 100, the platform-service-providing server 300 may, in the case of a message sent to a phone number, allow confirmation of the receipt to be performed, and in the case of email, allow confirmation of opening the email to be performed, and in the case of physical mail, allow confirmation of the physical mail to be performed. The confirmation of opening the email may be achieved by scanning a unique identification code, such as a QR code, that appears only when the email is opened, or by scanning a printed unique identification code that appears only when the physical mail is opened.

Referring to FIG. 4B, the platform-service-providing server 300 may, upon request posts being uploaded, list up the request posts for each category in descending order based on cumulative rewards, and referring to FIG. 4C, specify a company name (a requester's name), a purpose of use, a reception method (one of a phone number/email/physical mail), and a sender's name in advance. For example, a 050 number in the case of a phone number, a sender's name or email address in the case of email, and a sender's address in the case of postal mail may be allowed to be specified. In addition, the requester terminal 400 may provide items desired to be purchased individually or in total, and may provide the user terminal 100 with expected revenue per sale item, etc. Referring to FIG. 4D, the platform-service-providing server 300 may provide a revenue history to each user terminal 100 by providing information users (requesters), purchase items, and bid prices by date, providing overall revenue statistics or failure statistics by date, month, year, requester, and item, and providing a total revenue amount, and providing a withdrawal and balance history in a format similar to a bankbook, including date, description, deposit, withdrawal, balance, and remarks, and specifying revenue after deducting income tax and fees. When making a settlement, the settlement may be confirmed through an identity verification process of the user terminal 100, the settlement date and time, limit, frequency, exception provisions, and the like may be disclosed, and the deposit after tax deduction may be specified.

<Contact Point Management Policy>

In the case of a phone number among contact points, using the above-described sunset-type safe number may enable management of the information usage period and mapping between a random safe number and the phone number of the user terminal 100. In the case of email, it is required to provide a subject separator separated by [ ], obtain consent, and increase the open rate. In this case, whether the email content, design, and attachment files requested by the requester terminal 400 are transmittable may also be checked in advance. Also, in order to prevent users from leaving and increase the reading rate, a preset feedback number or text may be entered after opening the email. In the case of a postal address, a method of uploading a photo after receiving the physical mail or entering a printed number when opening the physical mail may be used.

<Front Page>

The statistics screen may provide the total number of participants, the total cumulative sales amount, the average sales amount per user, the number of sales per user, and the average sales amount per database. In addition, the statistics screen may provide the number of desired sales databases per user, the average total asking price per user, the total property database count (EA), the total asking price in the property database (KRW), the average asking price per database, and the number of resales per database.

Content of the method of providing the personal-information-sharing platform service based on the right to data portability omitted from the description referring to FIGS. 2 to 19 may be the same as the method of providing the personal-information-sharing platform service based on the right to data portability described with reference to FIG. 1, or may be easily inferred from the content described above, and thus details thereof will be omitted.

FIG. 5 is a flowchart showing a process of transmitting and receiving data between the components included in the system for providing the personal-information-sharing platform service based on the right to data portability shown in FIG. 1 according to an embodiment of the present invention. Hereinafter, an example of a process of transmitting and receiving data between the components will be described with reference to FIG. 5, but the present application is not limited to the embodiment, and it is obvious to those skilled in the art that the process of transmitting and receiving data shown in FIG. 5 may be changed according to the various embodiments described above.

Referring to FIG. 5, the platform-service-providing server obtains consent to provision of personal information for use of the personal information from the user terminal (S5100).

Then, the platform-service-providing server receives at least one piece of personal information from the user terminal and stores the received at least one piece of personal information (S5200), and when the requester terminal requests at least one piece of personal information, sets a budget for using the at least one piece of personal information (S5300).

In addition, when the requester terminal is awarded a bid, the platform-service-providing server specifies an information usage period, which is a viewing restriction, for a preset item of personal information among the at least one piece of personal information and provides the information usage information (S5400).

The order of the above-described operations (S5100 to S5400) is only an example and is not limited thereto. That is, the order between the above-described operations (S5100 to S5400) may change, and some of the operations may be executed concurrently or deleted.

Content of the method of providing the personal-information-sharing platform service based on the right to data portability omitted from the description referring to FIG. 5 may be the same as the method of providing the personal-information-sharing platform service based on the right to data portability described with reference to FIGS. 1 to 4, or may be easily inferred from the content described above, and thus details thereof will be omitted.

The method of providing a personal-information-sharing platform service based on the right to data portability according to an embodiment described in FIG. 5 may be implemented in the form of a recording medium including instructions executable by a computer, such as an application or program module executable by a computer. Computer-readable media may be any available media that may be accessed by a computer and include both volatile and non-volatile media, and removable and non-removable media. Additionally, computer-readable media may include all types of computer storage media. Computer storage media include both volatile and non-volatile, and removable and non-removable media implemented in any method or technology for storage of information such as computer readable instructions, data structures, program modules or other data.

The method of providing a personal-information-sharing platform service based on the right to data portability according to the embodiment of the present invention described above may be executable by an application installed by default on a terminal (which may include programs included in a platform or operating system installed by default on the terminal, etc.) and may also be executed by an application (i.e. programs) installed directly on a master terminal by a user through an application-providing server such as an application store server or a web server associated with an application or service. In this sense, the method of providing a personal-information-sharing platform service based on the right to data portability according to the embodiment of the present invention described above may be implemented as an application (i.e., a program) installed by default on the terminal or directly installed by the user, and may be recorded on a readable recording medium readably by a computer of a terminal, etc.

It will be apparent to those skilled in the art to which the present invention belongs that the present invention may be embodied in other specific forms without changing the technical sprit or essential features thereof. It should therefore be apparent that the above-described embodiments are illustrative in all aspects and not restrictive. For example, each component described in a singular form may be implemented in a distributed manner, and similarly, components described as being distributed may also be implemented in a combined form.

The scope of the present invention is defined by the appended claims rather than by the foregoing description, and all changes or modifications derived from the meaning and scope of the claims and the equivalents thereof should be interpreted as being included in the scope of the present invention.

The invention claimed is:

1. A system for providing a personal-information-sharing platform service based on a right to data portability, the system comprising:
    a user terminal configured to consent to provision of personal information for use of the personal information, input at least one type of personal information for the use of the personal information, and set a price for the at least one type of personal information;
    a requester terminal configured to request personal information of the user terminal and view a preset item of personal information included in the personal information within a preset information usage period; and
    a platform-service-providing server including a consent storage unit configured to obtain consent to provision of personal information for use of the personal information from the user terminal, a database storage unit configured to receive at least one piece of personal information from the user terminal and store the received at least one piece of personal information, an auction unit configured to, upon receiving request of the requester terminal for the at least one piece of personal information, set a budget for using the at least one piece of personal information, and a period limit unit configured to, upon the requester terminal being awarded a bid, designate an information usage period, which is a viewing restriction, for the preset item of personal information among the at least one piece of personal information, and provide the information usage period.

2. The system of claim 1, wherein the auction unit is configured to
    sort personal information according to a condition requested by the requester terminal;
    upon a budget being input by the requester terminal, arrange the personal information in ascending order based on prices set by the user terminal to sell the personal information, and
    derive a number of pieces of personal information that are purchasable by the requester terminal within a range of the budget.

3. The system of claim 1, wherein the platform-service-providing server further includes
    a sunset number provision unit configured to, during the information usage period, provide a sunset type safe number substituted for a phone number among the personal information.

4. The system of claim 1, wherein the platform-service-providing server further includes an abuse prevention unit configured to, when an email or an address is provided among the personal information, allow a unique identification code that is output when the email of the user terminal is opened or a unique identification code printed or inserted in a mail envelope delivered to the address to be input to pay points based on the provision of personal information to the user terminal.

5. The system of claim 1, wherein the platform-service-providing server further includes
    a request post management unit configured to upload request posts of requesters requesting provision of personal information, arrange the request posts to be divided according to preset categories, and list up the request posts for each preset category sorted in descending order based on cumulative rewards.

6. The system of claim 1, wherein the platform-service-providing server further includes
    an information provision unit configured to provide the user terminal with a database for the use of the personal information and statistical data including a bid amount, and provide a maximum value, an average value, and a minimum value of the bid amount.

7. The system of claim 1, wherein the platform-service-providing server further includes
    a sender-receiver-specifying unit configured to,
    when uploading request posts of a requester requesting provision of personal information from the requester terminal, designate a name of a requesting company and a purpose of use of the requester as required information, allow at least one of a phone number, an email address, and an address among the personal information to be selected, and allow a sender's name to be entered such that the sender's name is made explicit.

8. The system of claim 1, wherein the platform-service-providing server further includes
    a revenue status unit configured to, when providing revenue earned by the user terminal from the provision of the personal information as a history log, provide requesters, purchase items, and bid prices by date, provide revenue statistics by date, month, year, requester, and item, and provide a history for a total revenue amount, withdrawals, and balances.

* * * * *